United States Patent
Yasui et al.

(10) Patent No.: US 8,195,371 B2
(45) Date of Patent: Jun. 5, 2012

(54) MOTION CONTROL DEVICE FOR VEHICLE

(75) Inventors: Yoshiyuki Yasui, Nagoya (JP); Keita Nakano, Hamamatsu (JP); Hiroyuki Kodama, Kariya (JP); Masaki Maruyama, Nagoya (JP); Takayuki Miyajima, Anjo (JP); Yoshito Kondo, Okazaki (JP); Atsushi Takeuchi, Nagoya (JP); Motoshi Suzuki, Nagoya (JP)

(73) Assignees: Advics Co., Ltd, Kariya, Aichi-Pref. (JP); Aisin AW Co., Ltd, Anjo-Shi, Aichi (JP)

( * ) Notice: Subject to any disclaimer, the term of this patent is extended or adjusted under 35 U.S.C. 154(b) by 677 days.

(21) Appl. No.: 12/357,833

(22) Filed: Jan. 22, 2009

(65) Prior Publication Data

US 2009/0187322 A1    Jul. 23, 2009

(30) Foreign Application Priority Data

Jan. 23, 2008  (JP) .................................. 2008-012453
Jan. 25, 2008  (JP) .................................. 2008-014347

(51) Int. Cl.
*G06F 19/00* (2011.01)
(52) U.S. Cl. .............................. 701/70; 701/72; 340/905
(58) Field of Classification Search .................... 701/72, 701/70; 340/905
See application file for complete search history.

(56) References Cited

U.S. PATENT DOCUMENTS

| | | | |
|---|---|---|---|
| 6,392,535 B1 | 5/2002 | Matsuno et al. | |
| 6,778,896 B1 | 8/2004 | Matsuura et al. | |
| 7,764,192 B2 * | 7/2010 | Sekine | 340/905 |
| 2003/0163238 A1 * | 8/2003 | Matsumoto et al. | 701/70 |
| 2004/0111209 A1 | 6/2004 | Kagawa et al. | |
| 2004/0236490 A1 * | 11/2004 | Kin | 701/70 |
| 2005/0240334 A1 | 10/2005 | Matsumoto et al. | |

FOREIGN PATENT DOCUMENTS

| | | |
|---|---|---|
| DE | 10 2004 030997 A1 | 1/2006 |
| EP | 0 941 902 A2 | 9/1999 |
| EP | 1 074 421 A2 | 2/2001 |
| JP | 3378490 B2 | 12/2002 |
| JP | 3385812 B2 | 1/2003 |
| JP | 2004-142686 A | 5/2004 |
| JP | 2005-170152 A | 6/2005 |

OTHER PUBLICATIONS

Extended European Search Report dated Jul. 10, 2009 in corresponding European Patent Application No. 09 00 0792.

* cited by examiner

*Primary Examiner* — Thomas Black
*Assistant Examiner* — Shardul Patel
(74) *Attorney, Agent, or Firm* — Buchanan Ingersoll & Rooney PC

(57) ABSTRACT

A motion control device for a vehicle includes a vehicle speed obtaining means for obtaining a speed of the vehicle, a curve shape obtaining means for obtaining a shape of a curve existing ahead of the vehicle on a road on which the vehicle is traveling, a position obtaining means for obtaining a relative position of the vehicle to the curve, a determining means for determining an appropriate vehicle speed for the vehicle to travel through the curve based on the shape of the curve obtained by the curve shape obtaining means, and a speed reduction controlling means for performing a speed reduction control on the vehicle based on the appropriate vehicle speed determined by the determining means.

13 Claims, 25 Drawing Sheets

MOTION CONTROL DEVICE FOR VEHICLE

CROSS REFERENCE TO RELATED APPLICATIONS

This application is based on and claims priority under 35 U.S.C. §119 to Japanese Patent Application No. 2008-012453, filed on Jan. 23, 2008 and No. 2008-014347, filed on Jan. 25, 2008, the entire contents of which are incorporated herein by reference.

FIELD OF THE INVENTION

This invention generally relates to a motion control device for a vehicle. More particularly, this invention pertains to a motion control device for a vehicle for executing an automatic reduction of a speed of the vehicle (i.e., a speed reduction control) when the vehicle travels through a curve existing ahead of the vehicle on a road on which the vehicle is traveling.

BACKGROUND

A known motion control device for a vehicle is disclosed in JP3385812B. According to the motion control device disclosed, in order to achieve an appropriate advancing vehicle speed when the vehicle advances to the curve, a deceleration distance required for the vehicle to be decelerated for advancing to the curve and a remaining distance defined from the current position of the vehicle to a curve starting point are obtained. Then, a speed reduction control is started when the remaining distance that is decreasing matches the deceleration distance. The speed reduction control is finished when the remaining distance is equal to zero and the vehicle passes over the curve starting point.

In addition, another motion control device for a vehicle is disclosed in JP2005-170152A. According to the device disclosed, in order to reduce the uncomfortable feeling given to a driver by the acceleration failure in the vicinity of a curve ending point, which results from the speed reduction control when the vehicle is driven through the curve, the control variable of the speed reduction control is decreased when it is determined that the vehicle is traveling before the curve ending point, thereby reducing the deceleration of the vehicle is reduced. In other words, the speed reduction control is not finished until the vehicle passes over the curve ending point.

As illustrated in FIG. 16, generally on a road, a single curve is constituted by an advance transition curve zone (i.e., transition curve zone on the entrance side), a constant curvature radius zone, and an exit transition curve zone (i.e., transition curve zone on the exit side) in this order towards a curve ending point (curve exit) from a curve starting point (curve entrance). The transition curve is, for example, structured by a clothoid curve. The transition curve zone is provided so that the vehicle smoothly travels through the curve while the driver gradually steers the steering wheel and then returns the steering wheel without an abrupt operation thereof.

When assuming the long advance transition curve zone, a start and/or an end of the speed reduction control is conducted relatively earlier than the intention of the driver in a state where the speed reduction control is performed so that the speed reduction is finished at the curve starting point as in the device disclosed in JP3385812B, thereby giving the driver the uncomfortable feeling.

Further, the uncomfortable feeling of the driver occurs when the vehicle is decelerated by the control even though the driver attempts to accelerate the vehicle, the vehicle cannot be accelerated because of the control even though the driver desires to accelerate, and the like. In particular, the driver tends to look at a point a certain distance ahead of the vehicle and to predict the vehicle condition at that point. That is, the driver does not look immediately ahead of the vehicle. Thus, in a case where the speed reduction control is not finished until the vehicle passes over the curve ending point as disclosed in JP2005-170152A, the uncomfortable feeling of the driver may remain.

A need thus exists for a motion control device for a vehicle which is not susceptible to the drawback mentioned above.

Further, still another motion control device for a vehicle is disclosed in JP2004-142686A. According to the device disclosed, a shape of a curve existing ahead of the vehicle on a road on which the vehicle is traveling is obtained. The speed reduction control for decelerating the vehicle is performed independently from the deceleration operation by the driver.

More specifically, one appropriate vehicle speed is specified for the vehicle traveling through the curve. In a case where the vehicle speed is greater than the appropriate vehicle speed when the vehicle advances to the curve, the speed reduction control is started at a predetermined position. In the speed reduction control, first, the deceleration of the vehicle is controlled by using a first target deceleration. Afterwards, the vehicle deceleration is controlled by using a second target deceleration, which is greater than the first deceleration, instead of the first target deceleration so that the vehicle is decelerated to the appropriate vehicle speed. Accordingly, when the speed reduction control is started in a state where the driver does not recognize the presence of the curve ahead of the vehicles the uncomfortable feeling unexpectedly given to the driver by the start of the speed reduction control, and the like may be reduced.

Following two cases are considered for the requirement of the speed reduction control at a time of the vehicle advancing to the curve. First, in a case where the deceleration operation is performed by the driver, the speed reduction control is required to assist the driver's deceleration operation by decelerating the vehicle to the appropriate vehicle speed. In this case, the appropriate vehicle speed is desirably specified to be sufficiently smaller than a vehicle speed for a turning limit of the vehicle. The speed reduction control in such case will be hereinafter referred to as a travel assistance control.

Second, in a case where the driver does not recognize the curve existing ahead of the vehicle, where the driver wrongly recognizes a radius of the curve to be larger than the actual radius, and the like, the speed reduction control is required to ensure the traveling stability of the vehicle by decelerating the vehicle to the appropriate vehicle speed so that a turning level (state) of the vehicle does not exceed the turning limit thereof. In this case, the speed reduction control is performed regardless of whether or not the deceleration operation is performed by the driver. At this time, different from the travel assistance control, the appropriate vehicle speed is desirably specified adjacent to a vehicle speed for the turning limit of the vehicle. The speed reduction control in such case will be hereinafter referred to as a limit protection control.

According to the device disclosed in JP2004-142686A, only one appropriate vehicle speed is specified for the vehicle traveling the curve. That is, the aforementioned two types of speed reduction control are not assumed or considered and therefore are not selectable depending on the operation condition of the vehicle.

A need thus exists for a motion control device for a vehicle, in order to address the drawback mentioned above, which can effectively perform a speed reduction control by selecting and using the aforementioned two types of speed reduction control depending on the traveling state of the vehicle.

SUMMARY OF THE INVENTION

According to an aspect of the present invention, a motion control device for a vehicle includes a vehicle speed obtaining means for obtaining a speed of the vehicles a curve shape obtaining means for obtaining a shape of a curve existing ahead of the vehicle on a road on which the vehicle is traveling, a position obtaining means for obtaining a relative position of the vehicle to the curve, a determining means for determining an appropriate vehicle speed for the vehicle to travel through the curve based on the shape of the curve obtained by the curve shape obtaining means, and a speed reduction controlling means for performing a speed reduction control on the vehicle based on the appropriate vehicle speed determined by the determining means.

The determining means determines, on the basis of the shape of the curve, a reference point in the middle of the curve and the appropriate vehicle speed for the vehicle to pass over the reference point. The motion control device further includes a calculating means for calculating, on the basis of the reference point and the appropriate vehicle speed, a target vehicle speed characteristic which is a target of a reduction characteristic of the vehicle speed relative to a position on the road in a case where the vehicle is decelerated on the road between the reference point and a point closer to the vehicle relative to the reference point. The speed reduction controlling means starts the speed reduction control for decelerating the vehicle in a case where a relationship between the vehicle speed and a position of the vehicle relative to the reference point obtained from the relative position meets a control start condition determined on the basis of the target vehicle speed characteristic and finishes the speed reduction control in a case where the vehicle speed falls within a predetermined range in which the appropriate vehicle speed is included.

The determining means includes a first determining means determining the appropriate vehicle speed as a first appropriate vehicle speed and a second determining means determining a second appropriate vehicle speed which is greater than the first appropriate vehicle speed and is an appropriate vehicle speed for the vehicle passing through the curve based on the shape of the curve. The motion control device further includes a first calculating means for calculating, on the basis of the first appropriate vehicle speed, a first target vehicle speed characteristic which is a target of a reduction characteristic of the vehicle speed relative to a position on the road in a case where the vehicle is decelerated when advancing to the curve, a second calculating means for calculating, on the basis of the second appropriate vehicle speed, a second target vehicle speed characteristic which is a target of the reduction characteristic of the vehicle speed relative to a position on the road in a case where the vehicle is decelerated when advancing to the curve, and a deceleration operation obtaining means for obtaining a deceleration operation by a driver. The speed reduction controlling means includes a first controlling means for starting and executing a first control for decelerating the vehicle to the first appropriate vehicle speed in a state where a first control permission condition is satisfied and the deceleration operation is performed, the first control permission condition in which a relationship between the vehicle speed and the relative position is determined on the basis of the first target vehicle speed characteristic, and a second controlling means for starting and executing a second control for decelerating the vehicle to the second appropriate vehicle speed regardless of whether or not the deceleration operation is performed in a state where a second control execution condition is satisfied, the second control execution condition in which a relationship between the vehicle speed and the relative position is determined on the basis of the second target vehicle speed characteristic. The second controlling means starts and executes the second control regardless of whether or not the first control is being executed. The first controlling means is prevented from starting the first control during the execution of the second control.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

A first embodiment of a motion control device (speed reduction control device) for a vehicle will be explained with reference to the attached drawings. A configuration of the motion control device explained below applies to both the first and second embodiments.

[Configuration]

Figure 1:
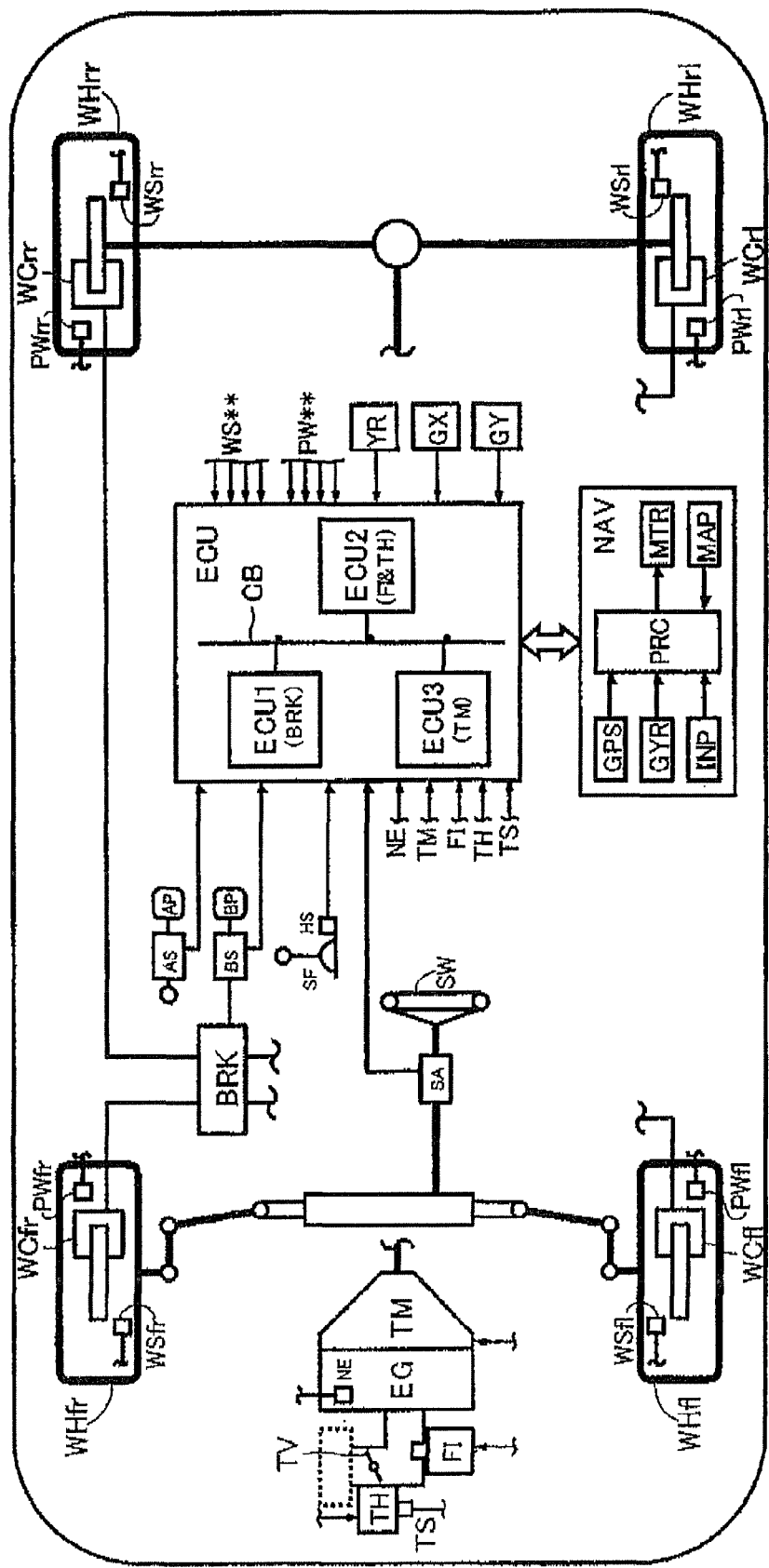
FIG. 1 is a diagram schematically illustrating a structure of a vehicle on which a motion control device for a vehicle according to first and second embodiments is mounted.

FIG. 1 schematically illustrates a structure of the vehicle to which the motion control device (which is hereinafter referred to as a device) is provided. The device includes an engine EG, which serves as a power source, an automatic transmission TM, a brake actuator BRK, an electronic control unit ECU, and a navigation device NAV.

For example, an internal combustion engine is used as the engine EG. More specifically, an opening degree of a throttle valve TV is adjusted by a throttle actuator TH in response to an operation of an acceleration pedal (acceleration operation member) AP by a driver. An amount of fuel proportional to an inhaled air volume, which is adjusted in response to the opening degree of the throttle valve TV, is injected by a fuel injection actuator FI (injector). As a result, the engine EG generates an output torque in response to the operation of the acceleration pedal AP by the driver.

A multi-stage automatic transmission having plural shift stages or a continuously variable automatic transmission having no shift stages may be used as the automatic transmission TM. The automatic transmission TM is configured so as to automatically (without being influenced by an operation of a gear lever SF by the driver) change a reduction gear ratio (a rotational speed of an output shaft of the engine EG (i.e. rotational speed of an input shaft of the transmission TM) divided by a rotational speed of an output shaft of the transmission TM) in response to an operation condition of the engine EG and a position of the gear lever SF, which serves as a shift operation member.

The brake actuator BRK has a known configuration in which plural electromagnetic valves, a hydraulic pump, a motor and the like are included. The brake actuator BRK supplies a brake pressure (brake hydraulic pressure) in response to an operation of a brake pedal BP, which serves as a brake operation member, by the driver to a wheel cylinder WC of each wheel WH when a brake control is not executed. Further, the brake actuator BRK is configured to individually adjust the brake pressure within the wheel cylinder WC of each wheel WH independently from the operation of the brake pedal BP (and the operation of the acceleration pedal AP).

Symbols '' are used to comprehensively indicate wheels, specifically, 'fl' indicates a front-left wheel, 'fr' indicate a front-right wheel, 'rl' indicates a rear-left wheel, and 'rr' indicates a rear-right wheel. Hence, for example, the wheel cylinder WC comprehensively indicates a front-left wheel cylinder WCfl, a front-right wheel cylinder WCfr, a rear-left wheel cylinder WCrl, and a rear-right wheel cylinder WCrr.

The device includes a wheel speed sensor WS for detecting a wheel speed of the wheel WH, a brake pressure sensor PW for detecting the brake pressure within the wheel cylinder WC, a steering wheel angle sensor SA for detecting a rotational angle (from a neutral position) of a steering wheel SW, a yaw rate sensor YR for detecting a yaw rate of a vehicle body, a longitudinal acceleration sensor GX for detecting an acceleration (deceleration) generated in a front-rear direction (longitudinal direction) of the vehicle body, a lateral acceleration sensor GY for detecting an acceleration generated in a lateral direction of the vehicle body, an engine rotational speed sensor NE for detecting a rotational speed of the output shaft of the engine EG, an acceleration operation sensor AS for detecting an operation variable of the acceleration pedal AP, a brake operation sensor BS for detecting an operation variable of the brake pedal BP, a shift position sensor HS for detecting a position of the gear lever SF, and a throttle valve opening degree sensor TS for detecting an opening degree of the throttle valve TV.

The electronic control unit ECU is a microcomputer that electronically controls a power train system and a chassis system of the vehicle. The electronic control unit ECU is electrically connected to above-described each actuator, above-described each sensor, and the automatic transmission TM. Alternatively, the electronic control unit ECU is configured so as to communicate with above-described each actuator, above-described each sensor and the automatic transmission TM via a network. The electronic control unit ECU is configured with plural control units ECU1, ECU2, and ECU3), which are connected to one another via a communication bus CB.

The ECU1 included in the electronic control unit ECU is a wheel brake control unit serving as a wheel brake controlling means. The ECU1 is configured so as to execute a brake pressure control (wheel brake control) such as a known anti-slid control (ABS control), a traction control (TCS control), a vehicle stability control (ESC control) and the like by controlling the brake actuator BRK on the basis of signals outputted from the wheel speed sensor WS**, the longitudinal acceleration sensor GX, the lateral acceleration sensor GY, the yaw rate sensor RY and the like.

The ECU2 included in the electronic control unit ECU is an engine control unit serving as an engine output reducing means. The ECU2 is configured so as to execute an output torque control (engine control) of the engine EG by controlling the throttle actuator TH and the fuel injection actuator FI on the basis of a signal outputted from the acceleration operation sensor AS and the like.

The ECU3 included in the electronic control unit ECU is an automatic transmission control unit serving as a transmission controlling means. The ECU3 is configured so as to execute a reduction gear ratio control (transmission control) by controlling the automatic transmission TM on the basis of a signal outputted from the shift position sensor HS and the like.

The navigation device NAV includes a navigation processor PRC. The navigation processor PRC is electrically connected to a vehicle position detecting means (global positioning system) GPS, a yaw rate gyro GYR, an input portion INP, a storage portion MAP, and a display portion (display) MTR. The navigation device NAV is electrically connected to the electronic control unit ECU. Alternatively, the navigation device NAV is configured so as to communicate with the electronic control unit ECU via radio waves.

The vehicle position detecting means GPS is configured to detect a position (latitude, longitude and the like) of the vehicle by using one of known methods utilizing a positioning signal from a satellite. The yaw rate gyro GYR is configured to detect an angular velocity (yaw rate) of the vehicle body. The input portion INP is configured to input therein an operation performed by the driver relating to a navigation function. The storage portion MAP memorizes therein various information such as map information, road information and the like.

The navigation processor PRC is configured to comprehensively process signals from the vehicle position detecting means GPS, the yaw rate gyro GYR, the input portion INP and the storage portion MAP and to display the processing results (information relating to the navigation function) on the display portion MTR.

[Curve Speed Reduction Control]

A curve speed reduction control executed by the device, more specifically by the electronic control unit ECU, according to the first embodiment having the above-described configuration will be described below. The first embodiment corresponds to Claims 2 to 10. The curve speed reduction control is provided for reducing the speed of the vehicle (i.e., for decelerating the vehicle) regardless of the acceleration or deceleration operation (i.e., operation of the acceleration pedal AP or the brake pedal BP) by the driver in cases where the vehicle is about to advance to a curve or a bend at a higher speed than a speed at which the vehicle can appropriately travel through the curve (i.e., an emergency braking is necessary). The curve speed reduction control enables the vehicle to appropriately travel through the curve. The speed reduction (i.e., deceleration) of the vehicle is achieved by means of at least one of an output reduction of the engine EG, a downshift of the automatic transmission TM, and a wheel brake.

In the curve speed reduction control, a point, at which the speed reduction is started, is determined on the basis of a speed of the vehicle (vehicle speed) Vx, a shape of the curve existing immediately ahead of the vehicle, and a relative position between the curve and the vehicle (i.e., a position of the vehicle relative to the curve, a distance between the curve and the vehicle). The speed reduction is started when the vehicle reaches the point determined. The speed reduction is ended when the vehicle speed Vx becomes appropriate.

Figure 2:
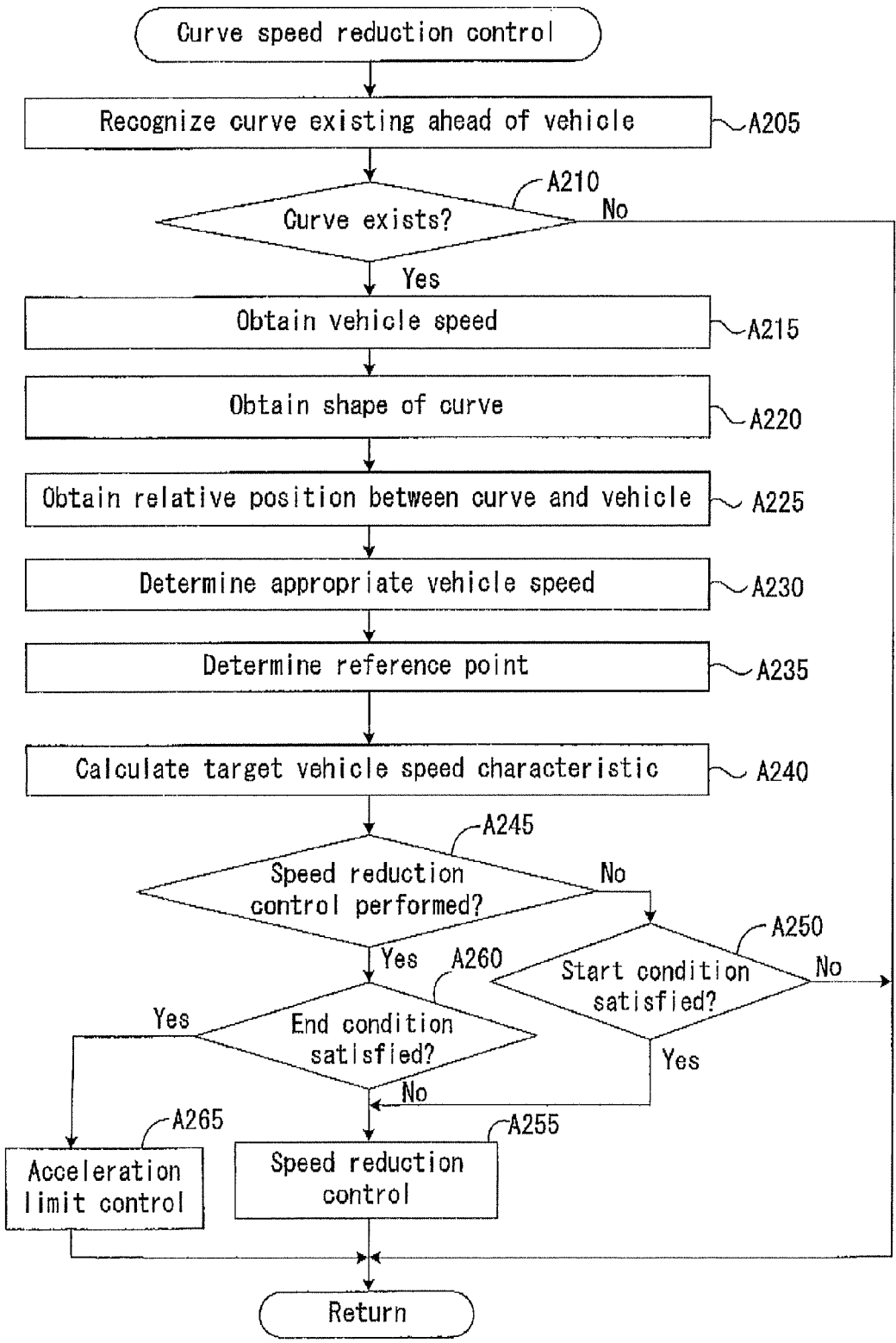
FIG. 2 is a flowchart illustrating a routine for a curve speed reduction control performed by an electronic control unit provided at the device illustrated in FIG. 1 according to the first embodiment.
Figure 3:
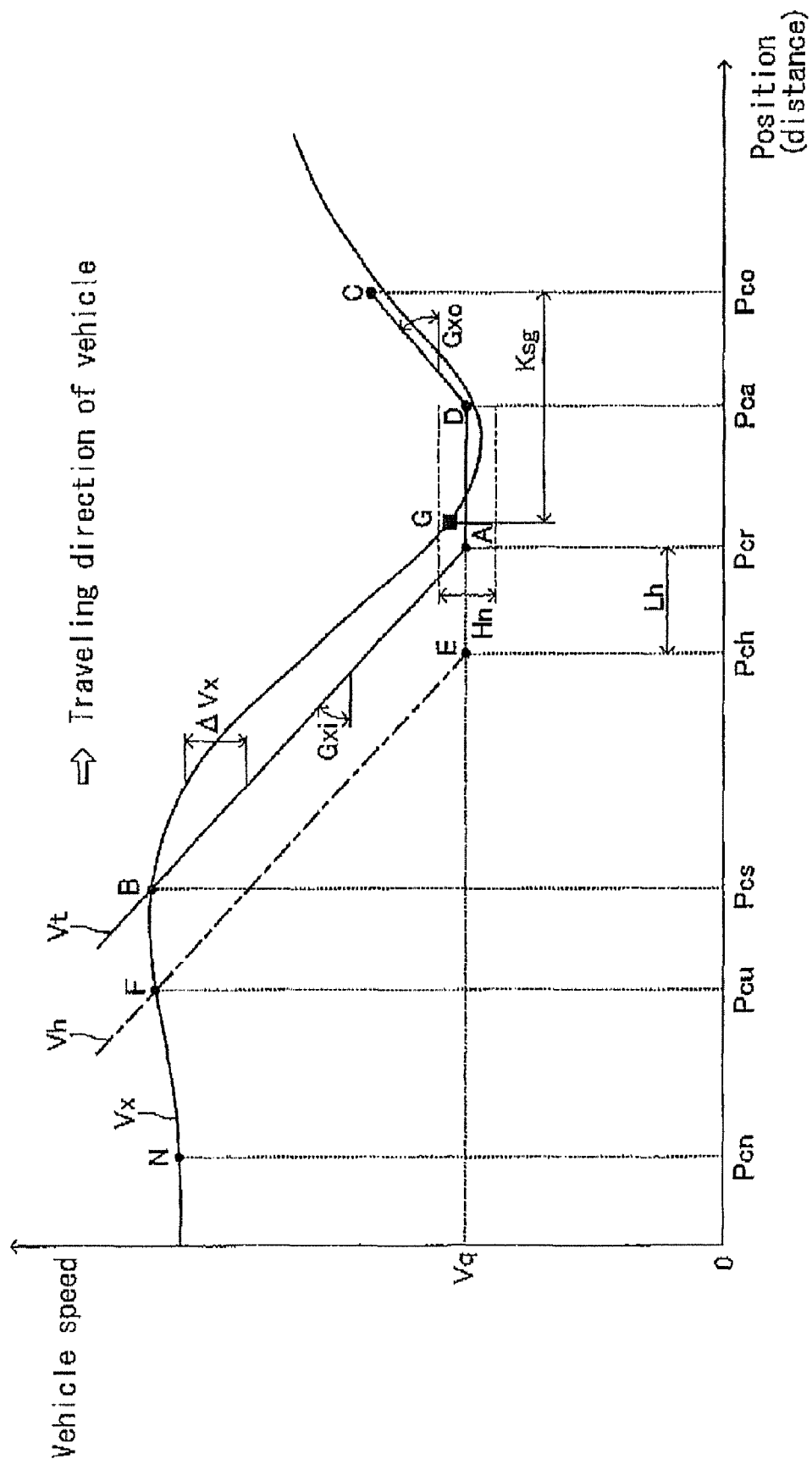
FIG. 3 is a graph illustrating an example of a relationship between a position of the vehicle on a road and a vehicle speed according to the first embodiment.

The curve speed reduction control is described in more detail below with reference to a routine illustrated by a flowchart of FIG. 2 and a diagram of FIG. 3 illustrating a relationship between the position of the vehicle on the road and the vehicle speed. The routine illustrated in FIG. 2 is executed at, for example, every predetermined operation period.

Firstly, in step A205, a process for recognizing a curve existing immediately ahead of the vehicle (i.e., curve recognition process) is executed. The curve recognition process is executed by at least one of the navigation device NAV and an image recognition device. For example, the presence of the curve is recognized once the vehicle approaches a range within a predetermined distance from the curve.

In step A210, the electronic control unit ECU determines whether or not the curve exists. In a case where the existence of the curve is not recognized, the routine illustrated in FIG. 2 is ended. On the other hand, in a case where the existence of the curve is recognized (see a point Pcn (point N) in FIG. 3), the processes following step A215 are executed.

In step A215, the current vehicle speed Vx is obtained. In step A220, the shape of the curve existing immediately ahead of the vehicle is obtained. In step A225, the relative position between the vehicle and the curve, whose shape is obtained in step A220, is obtained. Such information (i.e., the current vehicle speed Vx, the shape of the curve, and the relative position between the vehicle and the curve) may be obtained via the network within the vehicle. The aforementioned steps A215, A220, and A225 serve as a vehicle speed obtaining means, a curve shape obtaining means, and a position obtaining means, respectively.

Figure 4:
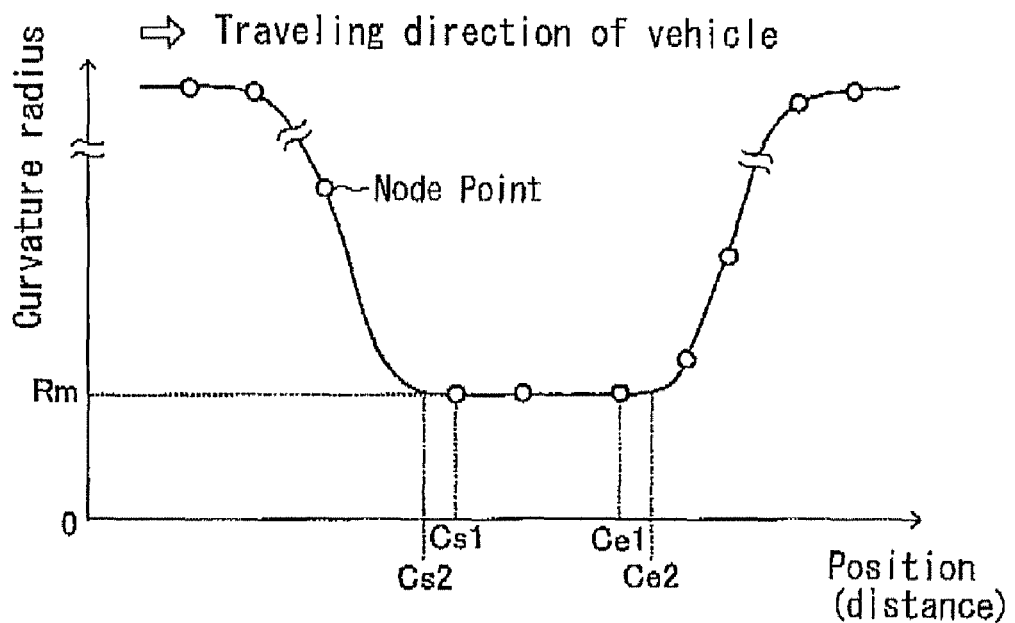
FIG. 4 is a graph illustrating a relationship between the position on the road and a curvature radius of the curve according to the first and second embodiments.

The shape of the curve (curvature radius Rc) may be estimated on the basis of curve information included in the aforementioned map information stored in the storage portion MAP. More specifically, positions such as the curve starting point and the curve ending point, and the curvature radius of each position are preliminarily memorized in the map information. In addition, positions of plural predetermined points on the road (node points) and the curvature radius of each position are memorized in the map information. As illustrated in FIG. 4, the curvature radius Rc of the curve may be estimated on the basis of an approximated curve formed by geometrically and smoothly connecting the aforementioned plural points. The detailed explanation of estimation of the curvature radius Rc of the curve based on the approximated curve is disclosed in JP3378490B.

A relative position Pc between the curve and the vehicle is obtained by using the vehicle position detecting means GPS of the navigation device NAV and the map information. More specifically, the current vehicle position (latitude, longitude and the like) on the coordinates fixed on the earth (terrestrial coordinates) is detected by the vehicle position detecting means GPS and the detected current vehicle position is set as an initial position of the vehicle. Then, after the initial position of the vehicle is determined by the vehicle position detecting means GPS, the relative position of the vehicle from the initial position is sequentially updated on the basis of information obtained from the yaw rate gyro GYR, the longitudinal acceleration sensor GX, the lateral acceleration sensor GY, the wheel speed sensor WS** and the like. The current vehicle position is estimated accordingly. The map information includes a position of each road (latitude and longitude). Hence, by referring to the current vehicle position and the position of the road, the relative position Pc between the curve and the vehicle is obtained.

Further, the relative position Pc between the curve and the vehicle, and the shape of the curve (the curvature radius Rc of the curve) may be obtained by using an image processing of a charge-coupled device (CCD) camera mounted on the vehicle. More specifically, a white line on the road or an edge portion of the road is detected on the basis of an image captured by a stereo camera mounted on the vehicle. Then, a distance distribution on the entire image is calculated on the basis of an offset amount of the corresponding positions in the stereo image and a principle of triangulation. Accordingly, the distance from the vehicle to the curve (i.e., a relative distance Pc between the curve and the vehicle) and the curvature radius Rc of the curve are obtained on the basis of the calculation results. The above-described method of obtaining the relative position between the vehicle and the curve, and the shape of the curve are disclosed in more detail in JP3379490B.

Figure 5:
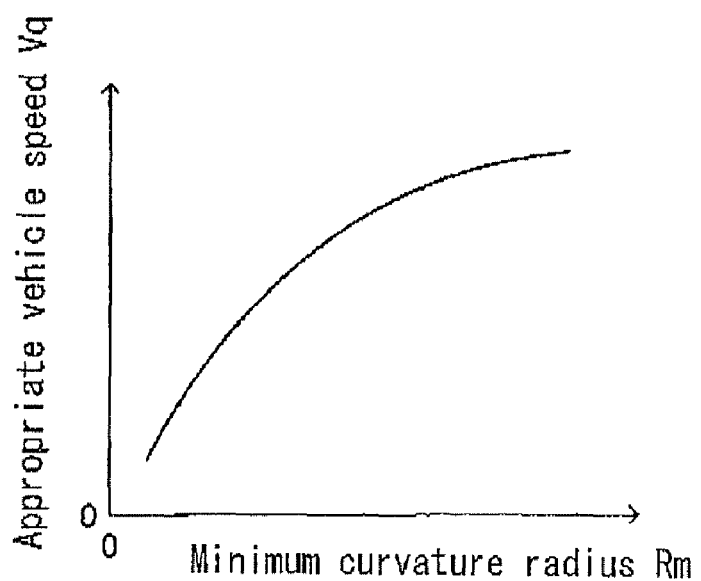
FIG. 5 is a graph illustrating a relationship between a minimum curvature radius and an appropriate vehicle speed according to the first embodiment.

In step A230, an appropriate vehicle speed Vq (see FIG. 3) is determined on the basis of the curvature radius Rc of the curve (for example, a minimum curvature radius Rm). The appropriate vehicle speed Vq is specified to be larger when the minimum curvature radius Rm is larger, according to a table illustrated in FIG. 5, for example.

Figure 16:
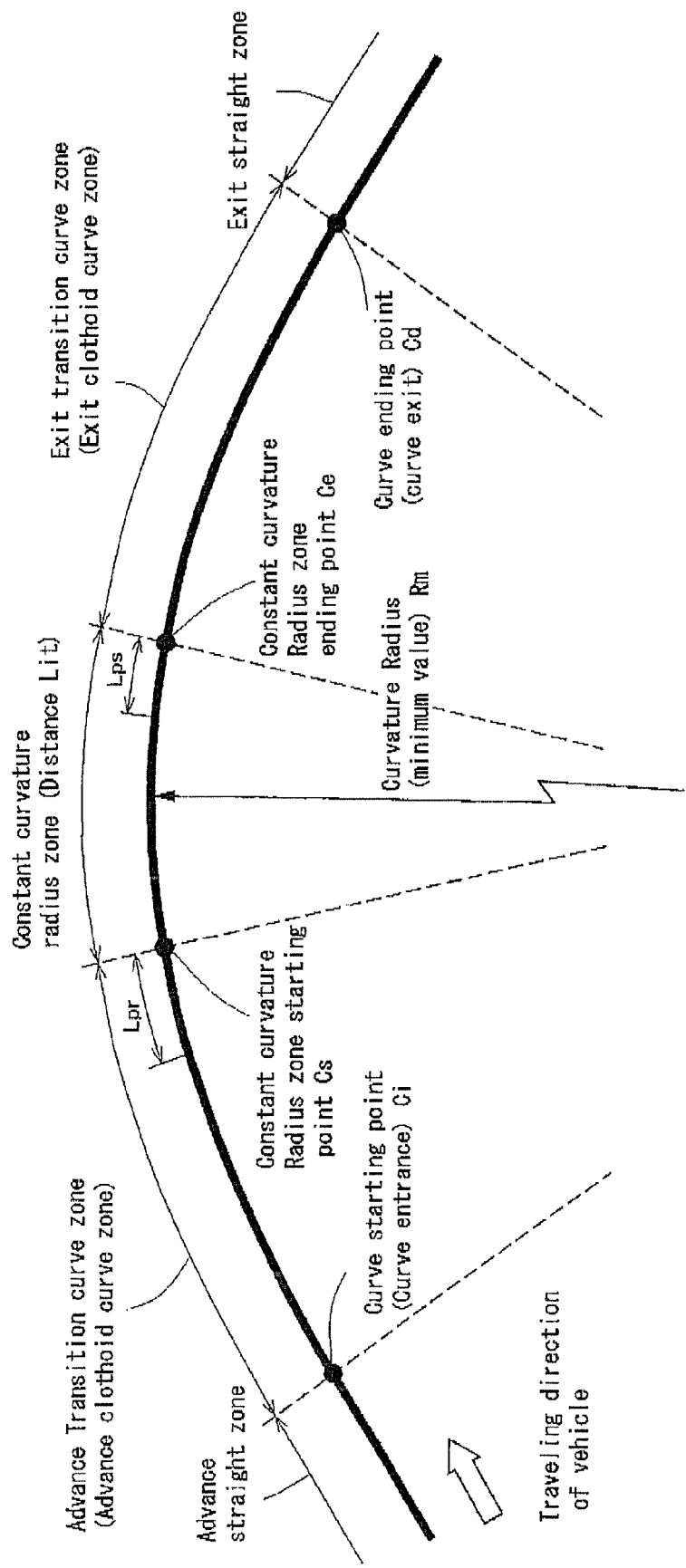
FIG. 16 is a diagram explaining a shape of the curve according to the first and second embodiments.

In step A235, a reference point Pcr is determined. The reference point Pcr is a target point at which the appropriate vehicle speed Vq is achieved. For example, a starting point of a constant curvature radius zone within the curve, i.e., a point nearest to the vehicle within the zone in which the curvature radius remains constant, is specified to be the reference point Pcr. In FIG. 16, the reference point Pcr corresponds to a constant curvature radius zone starting point Cs (i.e., ending point of an advance transition curve zone). Further, a point at which the curvature radius Rc becomes minimum within the curve may be specified to be the reference point Pcr. The aforementioned steps A230 and A235 each serve as a determining means.

A point Cs1 in FIG. 4 (i.e., a point corresponding to a node point existing at the front-most side within the constant curvature radius zone that is obtained on the basis of the approximated curve formed by geometrically and smoothly connecting the plural node points) may be specified to be the constant curvature radius zone starting point Cs. Alternatively, a point Cs2 in FIG. 4 (i.e., a starting point (a peripheral node at the front side) of the constant curvature radius zone obtained from the approximated curve) may be specified to be the constant curvature radius zone starting point Cs.

In step A240, as illustrated by a line A-B in FIG. 3, a target vehicle speed characteristic Vt in a case where the vehicle is decelerated according to a pre-set deceleration characteristic, i.e., decelerated at a deceleration Gxi, for example, is calculated on the basis of the appropriate vehicle speed Vq at the reference point Pcr as a reference. The aforementioned step A240 serves as a calculating means. The deceleration characteristic may be a pre-set constant value. As illustrated in FIG. 3, the target vehicle speed characteristic Vt is a target of a reduction characteristic of the vehicle speed relative to the vehicle position on the road (on the advance transition curve zone). Further, the target vehicle speed characteristic Vt has a property in which the vehicle speed becomes the appropriate vehicle speed Vq at the reference point Pcr and in which the target vehicle speed characteristic Vt is increased as being away from the reference point Pcr towards the vehicle. Illustrated in FIG. 3 is a case where the deceleration characteristic is constant. In this case, more properly, the line A-B forms an upwardly convex curve. However, the line A-B is expressed as a straight line in order to facilitate understanding.

Further, as illustrated by a line E-F in FIG. 3, a target vehicle speed characteristic for warning Vh in a case where the vehicle is decelerated according to a pre-set deceleration characteristic, which may be same as that for the target vehicle speed characteristic Vt, for example, is calculated on the basis of the appropriate vehicle speed Vq at a point Pch, as a reference, positioned closer to the vehicle relative to the reference point Pcr by a distance Lh. As illustrated in FIG. 3, the target vehicle speed characteristic for warning Vh is also a target of a reduction characteristic of the vehicle speed relative to the vehicle position on the road (on the advance transition curve zone). The target vehicle speed characteristic for warning Vh has a property in which the vehicle speed becomes the appropriate vehicle speed Vq at the point Pch and in which the target vehicle speed characteristic for warning Vh is increased as being away from the point Pch towards the vehicle.

In step A245, it is determined whether or not the curve speed reduction control is performed. When the curve speed reduction control is not performed, then it is determined whether or not a start condition for the curve speed reduction control is satisfied in step A250 (start determination).

Figure 6:
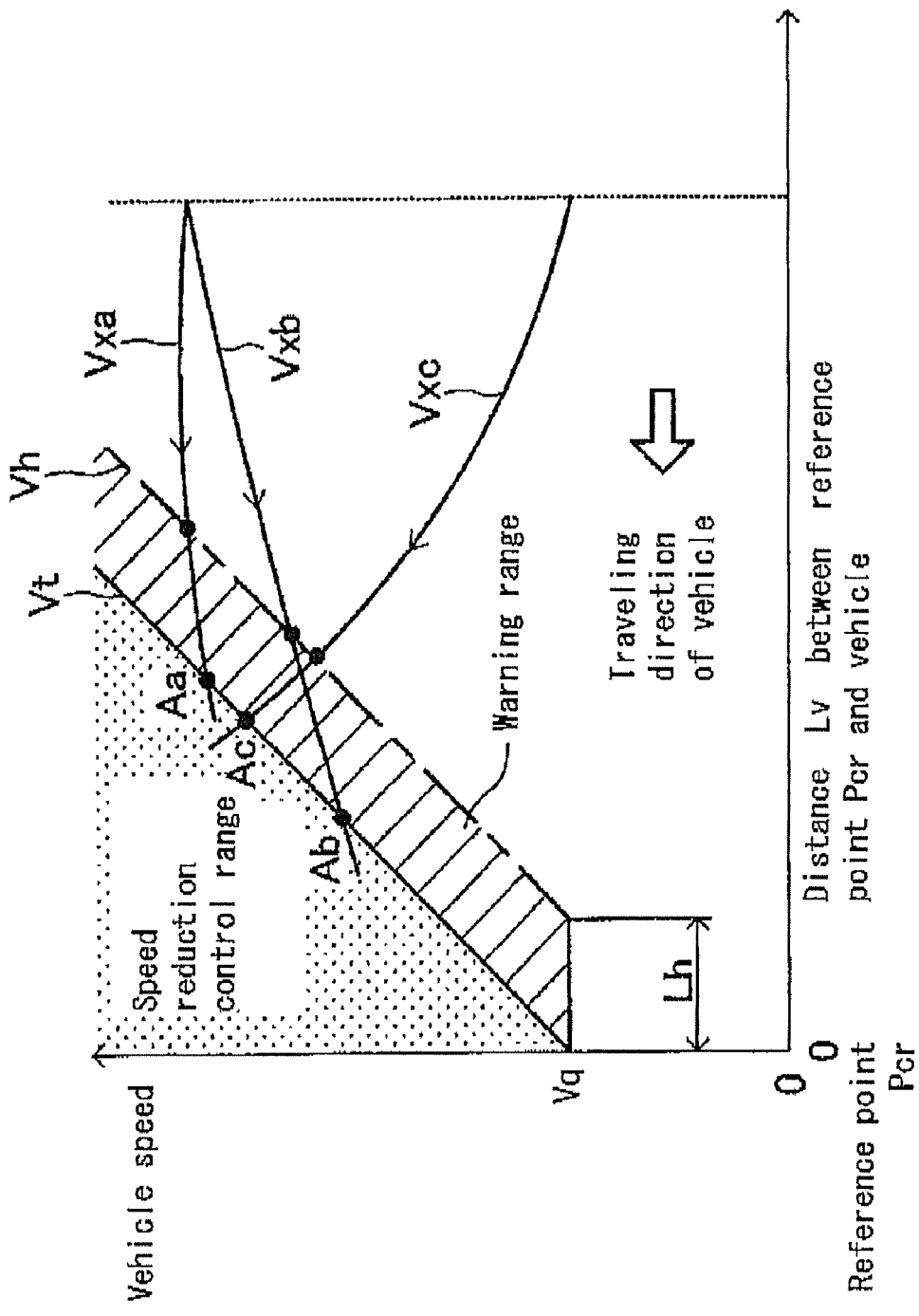
FIG. 6 is a diagram for explaining a start condition of the curve speed reduction control according to the first embodiment.

As illustrated in FIG. 6, the start determination is performed on the basis of the relative distance Pc between the curve and the vehicle, i.e., a distance Lv between the reference point Pcr and the vehicle, end the vehicle speed Vx. The distance Lv being zero (Lv=0) indicates the reference point Pcr. The distance Lv between the reference point Pcr and the vehicle corresponds to the current vehicle position relative to the reference point Pcr. In FIG. 6, a range provided at an upper left side of the target vehicle speed characteristic Vt shown by fine dots indicates a speed reduction control range where the curve speed reduction control is performed. In addition, a range provided between the target vehicle speed characteristic Vt and the target vehicle speed characteristic for warning Vh shown by diagonal lines indicates an warning range where a driver is alerted to the start of the curve speed reduction control (i.e., warning is performed) by means of a turning-on of a warning light and the like, before the start of the curve speed reduction control.

While the vehicle is approaching the curve, the distance Lv is decreasing and the vehicle speed Vx is changing in response to an operating status of the driver. Then, a point (Lv, Vx) moves on a coordinate plane illustrated in FIG. 6. When the point (Lv, Vx) passes over the target vehicle speed characteristic for warning Vh in the leftward direction in FIG. 6, the driver is first alerted to the start of the curve speed reduction control.

According to the aforementioned warning, the driver is encouraged to operate the brake pedal BP for decelerating the vehicle. Consequently, when the vehicle is sufficiently decelerated by means of a relatively strong brake operation by the driver and thus thereafter the point (Lv, Vx) is prevented from passing over the target vehicle speed characteristic Vt in FIG. 6, the curve speed reduction control is not started.

On the other hand, when the point (Lv, Vx) subsequently passes over the target vehicle speed characteristic Vt in FIG. 6 because of no brake operation or a relatively week brake operation by the driver, the start condition for the curve speed reduction control is satisfied, thereby starting the curve speed reduction control. The curve speed reduction control is performed regardless of the deceleration or acceleration operation by the driver before the start of the curve speed reduction control.

For example, in FIG. 6, the curve speed reduction control is started when the point (Lv, Vx) passes over the target vehicle speed characteristic Vt in any case where the vehicle travels at a substantially constant speed (vehicle speed Vxa), where the vehicle is decelerated by the driver operating the brake pedal BP (vehicle speed Vxb), and where the vehicle is accelerated by the driver operating the acceleration pedal AP (vehicle speed Vxc) (see points Aa, Ab and Ac). In FIG. 3, the driver is alerted to the start of the curve speed reduction control (specifically, warning is started and continued) at a point Pcu (point F) at which the line indicating the target vehicle speed characteristic for warning Vh intersects with the line indicating the vehicle speed Vx. In addition, the curve speed reduction control is started at a point Pcs point B) at which the line indicating the target vehicle speed characteristic Vt intersects with the line indicating the vehicle speed Vx.

Accordingly, in a case where the current vehicle speed exceeds the vehicle speed specified for the 'current vehicle position relative to the reference point, i.e., Lv' in the target vehicle speed characteristic for warning Vh, the driver is alerted to the start of the curve speed reduction control (or a warning staring condition is satisfied). Afterwards, when the current vehicle speed exceeds the vehicle speed specified for the 'current vehicle position relative to the reference point, i.e., Lv' in the target vehicle speed characteristic Vt, the curve speed reduction control is started (or a start condition therefore is satisfied). Accordingly, the start condition for warning (alerting the driver) is satisfied earlier than the start condition for the curve speed reduction control.

Figure 7:
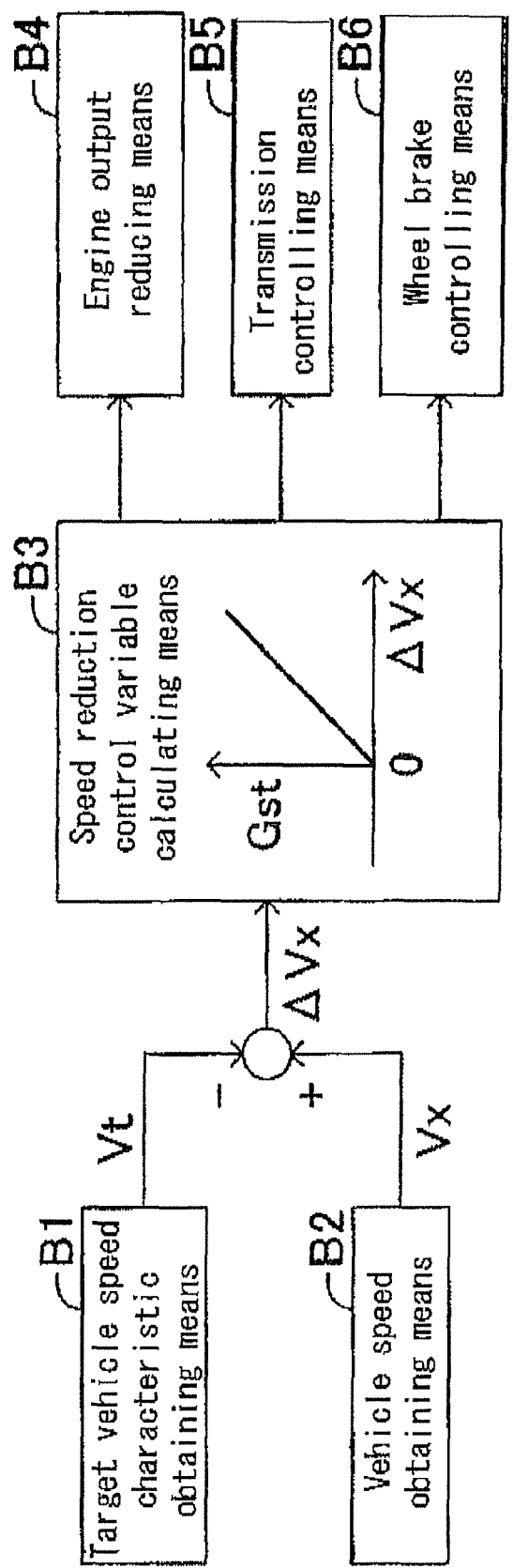
FIG. 7 is a functional block diagram relating to the curve speed reduction control according to the first and second embodiments.

When the start condition for the curve speed reduction control is satisfied, the curve speed reduction control is started and executed in step A255. FIG. 7 illustrates a functional block diagram relating to the curve speed reduction control. As illustrated in FIG. 7, a target vehicle speed characteristic obtaining means B1 calculates and obtains a target vehicle speed Vt at the current vehicle position on the basis of the target vehicle speed characteristic Vt. A vehicle speed obtaining means B2 obtains the current vehicle speed Vx.

A speed reduction control variable calculating means B3 calculates and determines a speed reduction control variable Gst on the basis of a deviation $\Delta Vx$ between the vehicle speed Vx and the target vehicle speed Vt ($\Delta Vx=Vx-Vt$, see FIG. 3). The speed reduction control variable Gst is determined to be zero (0) in a case where the deviation $\Delta Vx$ is negative. On the other hand, in a case where the deviation $\Delta Vx$ is positive, the greater the deflation $\Delta Vx$ is, the greater value the speed reduction control variable Gst is determined to be.

Then, on the basis of the speed reduction control variable Gst, one or more of the reduction of the engine output by an engine output reducing means B4 (at least one of a reduction of the throttle opening degree, a retardation of an ignition timing, and a reduction of a fuel injection amount), an increase of the 'reduction gear ratio' (downshift and the like) by a transmission controlling means B5, and an application of a brake torque (application of the brake pressure) executed by a wheel brake controlling means B6 by means of the wheel brake, is executed. As a result, the vehicle speed Vx is reduced down to the appropriate vehicle speed Vq so as to follow the target vehicle speed characteristic Vt.

In a case where the curve speed reduction control is being performed, it is determined whether or not an end condition for the curve speed reduction control is satisfied in step A260. The end condition is satisfied when the vehicle speed Vx approximately reaches the appropriate vehicle speed Vq. More specifically, for example, as illustrated in FIG. 3, the curve speed reduction control is finished when the decreasing vehicle speed Vx reaches a point (point G) which exists within a small range Hn in which the appropriate vehicle speed Vq is included. The aforementioned steps A245, A250, A255, A260 each serve as a speed reduction controlling means.

After the curve speed reduction control is finished, an acceleration limit control is started and executed in step A265, which serves as an acceleration limit controlling means. That is, while the wheel brake control is completely finished (the brake torque and the brake pressure are set to zero), a state of limited acceleration (limited throttle opening degree) and downshift of the transmission TM is continued through a continuation value Ksg (see FIG. 3). A value in the continuation value Kgs indicates a distance or time.

Because the curve speed reduction control is executed independently of the acceleration/deceleration operation of the driver, the driver may operate the acceleration pedal AP while the curve speed reduction control is executed. If the acceleration limit control is not executed immediately after the end of the curve speed reduction control in the above-mentioned state, the vehicle may be suddenly accelerated (an excessive acceleration slip may occur at a driving wheel). Hence, the acceleration limit control is executed through the predetermined continuation value Ksg.

In the acceleration limit control, as illustrated in FIG. 3, firstly, the acceleration is completely limited (from the point G to a point D, i.e., from a speed reduction control ending point to a point Pca) for a predetermined period of time. Then, a degree of limitation on the acceleration is gradually relaxed so that an allowable acceleration degree (acceleration Gxo) gradually increases (from the point D to a point C, i.e., from the point Pca to a point Pco). Then, finally, the acceleration limit is cancelled (at the point C, the point Pco).

The driver may prefer accelerating the vehicle towards the curve ending point. Hence, the device may be modified so that the downshift of the transmission TM is continued (i.e., constant reduction gear ratio is continued) through a predetermined value after the acceleration limit is cancelled. A value in the predetermined value indicates a distance or time.

Figure 8:
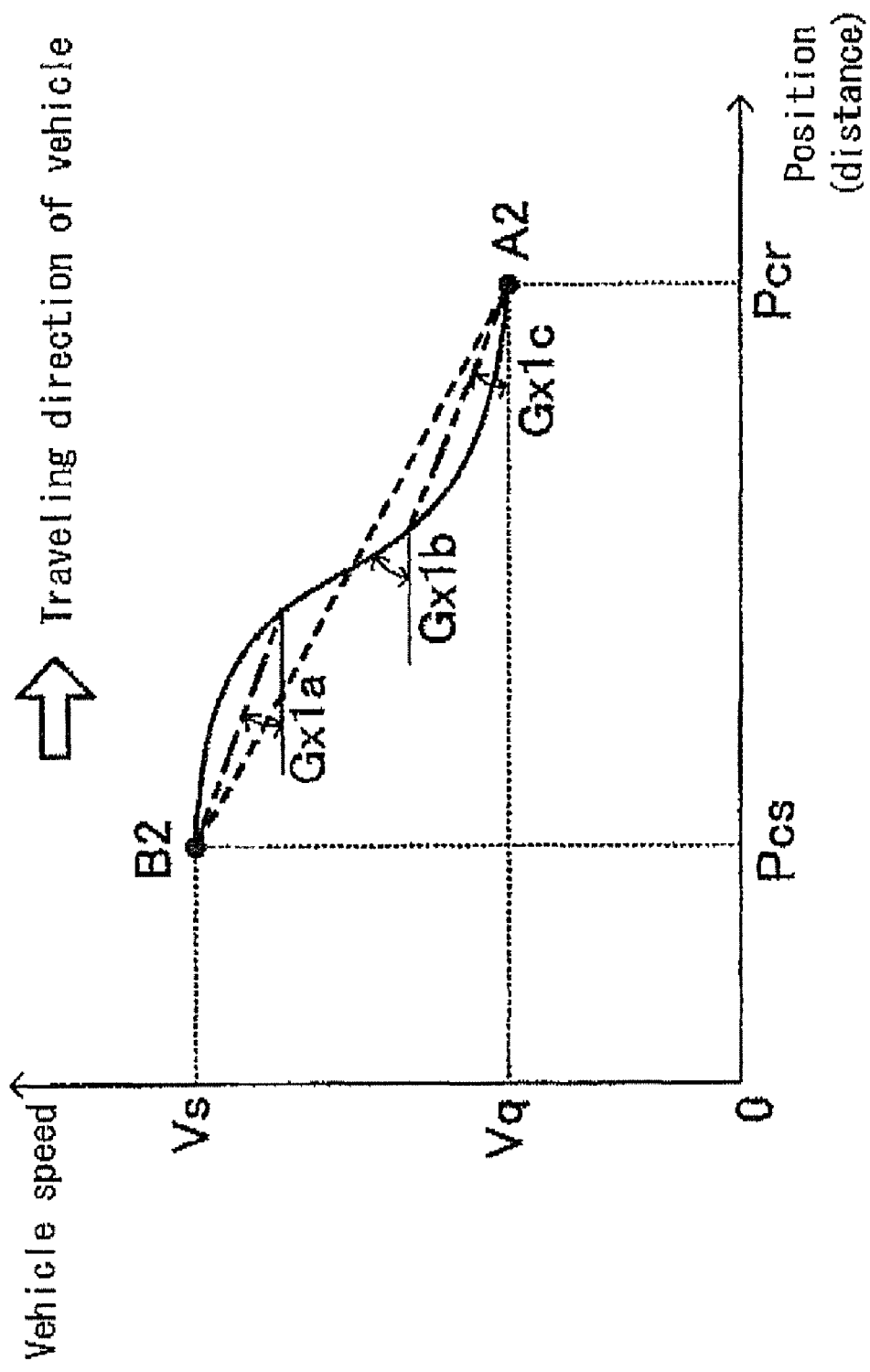
FIG. 8 is a graph illustrating examples of a target vehicle speed characteristic used for the curve speed reduction control according to the first embodiment.

The target vehicle speed characteristic Vt may be specified as shown by a solid (curving) line in FIG. 8 so that temporal changes in deceleration (i.e., jerk) becomes small. That is, in a first-half of the curve speed reduction control, the vehicle is gently decelerated from the vehicle speed Vs immediately after the speed reduction control start (point B2). Afterwards, the deceleration increases gradually. Then, in a second-half of the curve speed reduction control, the deceleration decreases so that the vehicle speed is gently reduced to the appropriate vehicle speed Vq immediately before the speed reduction control ending point (point A2). Because the driver tends to be extremely sensitive to a change in deceleration, the target vehicle speed characteristic Vt specified in the aforementioned manner gives the driver the smooth deceleration feeling as compared to a case of the constant deceleration.

Instead of the aforementioned target vehicle speed characteristic Vt shown by the solid (curving) line in FIG. 8, the target vehicle speed characteristic Vt may be obtained by an approximation of multiple (for example, three in FIG. 8) straight lines shown by dashed lines having different inclinations (i.e., decelerations) from each other, i.e., decelerations Gx1a, Gx1b, and Gx1c. Further, the target vehicle speed characteristic Vt shown by the solid (curving) line in FIG. 8 may be modified in such a way that the deceleration is constant in either the first-half or the second-half of the curve speed reduction control.

The reference point Pcr may be set at a point existing a distance Lpr closer to the vehicle relative to the constant curvature radius zone starting point Cs (ending point of the advance transition curve zone) within the curve (see FIG. 16) in view of a possible delay of the speed reduction (e.g., a delay of downshift of the transmission TM) while the curve speed reduction control is executed. As a result, the vehicle speed may be reduced down to the appropriate vehicle speed Vq before the vehicle reaches the point Cs in view of a possibility of an error included in information related to the position, and the like.

Figure 9:
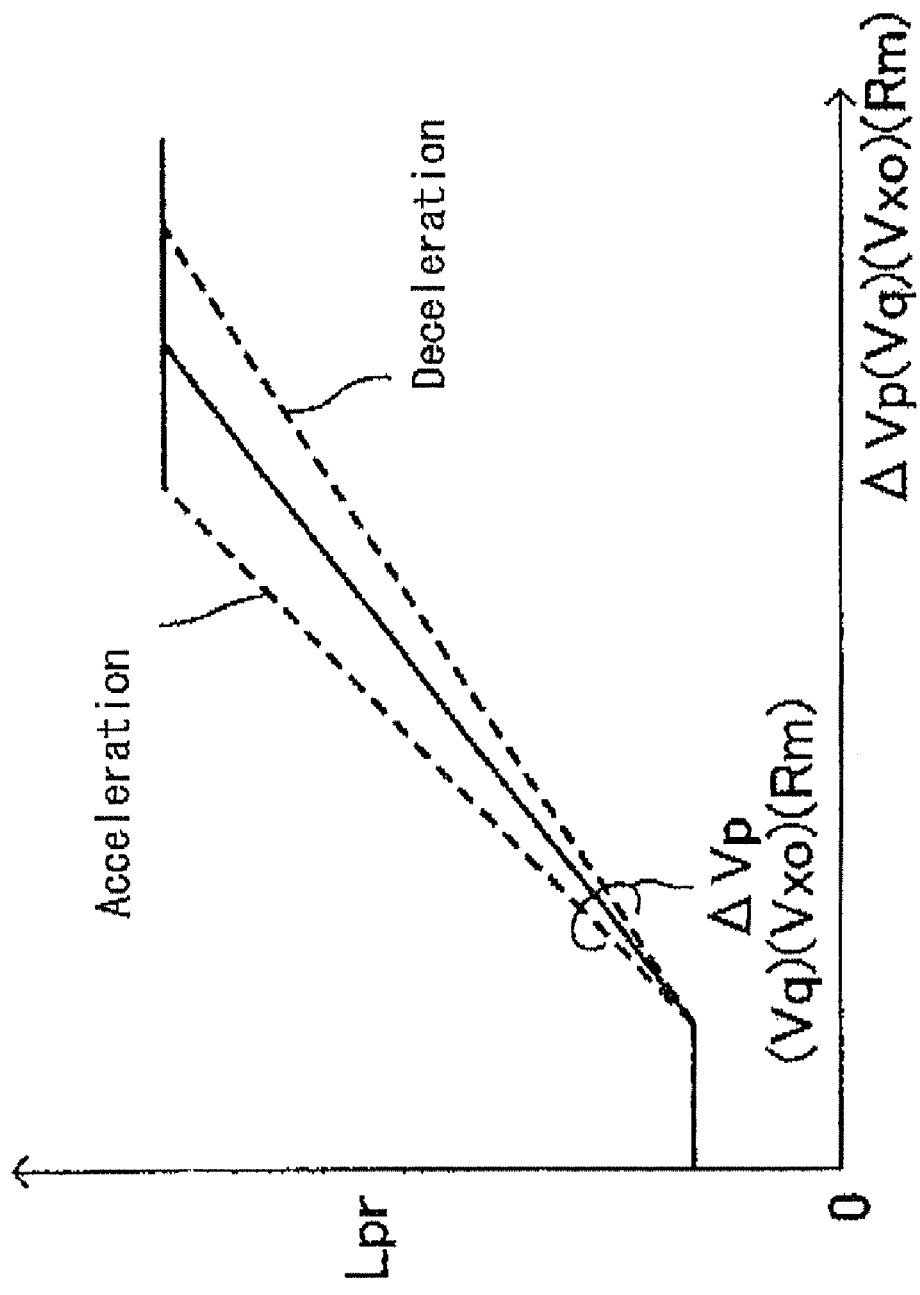
FIG. 9 is a graph illustrating a table used for specifying a distance of a reference point from a starting point of a constant curvature radius zone in a case where the reference point is provided at a front side of the constant curvature radius zone starting point according to the first embodiment.

In this case, the distance Lpr may be determined, using a table shown by a solid line in FIG. 9, on the basis of a difference between an advancing vehicle speed Vxo and the appropriate vehicle speed Vq, i.e., a difference Vp (i.e., ΔVp=Vxo−Vq). The larger the difference ΔVp is, the larger the distance Lpr is specified to be. The advancing vehicle speed Vxo may be defined as a vehicle speed at either one of a point where the recognition of the curve is made (i.e., point Pcn in FIG. 3), a point where the warning is started (i.e., point Pcu in FIG. 3), and a point where the curve speed reduction control is started (i.e., point Pcs in FIG. 3). Alternatively, the advancing vehicle speed Vxo may be defined as a vehicle speed obtained on the basis of two or three of vehicle speeds (average, weighted average, and the like) at the point where the recognition of the curve is made, the point where the warning is started, and the point where the curve speed reduction control is started.

In addition, as illustrated by the solid line in FIG. 9, the distance Lpr may be determined to be larger along with the increase of the appropriate vehicle speed Vq. Further, the distance Lpr may be defined to be larger along with the increase of the advancing vehicle speed Vxo or the minimum curvature radius Rm. This is because, when the vehicle speed is higher, an error becomes significant in the moving distance of the vehicle resulting from a possible error included in the aforementioned information related to the position, and the like. Thus, in consideration of such incident, the speed reduction (deceleration) should be started earlier when the vehicle speed is higher.

Further, as shown by an upper dashed-line in FIG. 9, the distance Lpr may be defined to be larger when the vehicle is being accelerated at either one of the aforementioned three points (i.e., points Pcn, Pcu, and Pcs in FIG. 3) as compared to a case where the vehicle is driven at a constant speed. In the same way, as shown by a lower dashed-line in FIG. 9, the distance Lpr may be defined to be smaller when the vehicle is being decelerated at either one of the aforementioned three points (i.e., points Pcn, Pcu, and Pcs in FIG. 3) as compared to a case where the vehicle is driven at a constant speed.

Figure 10:
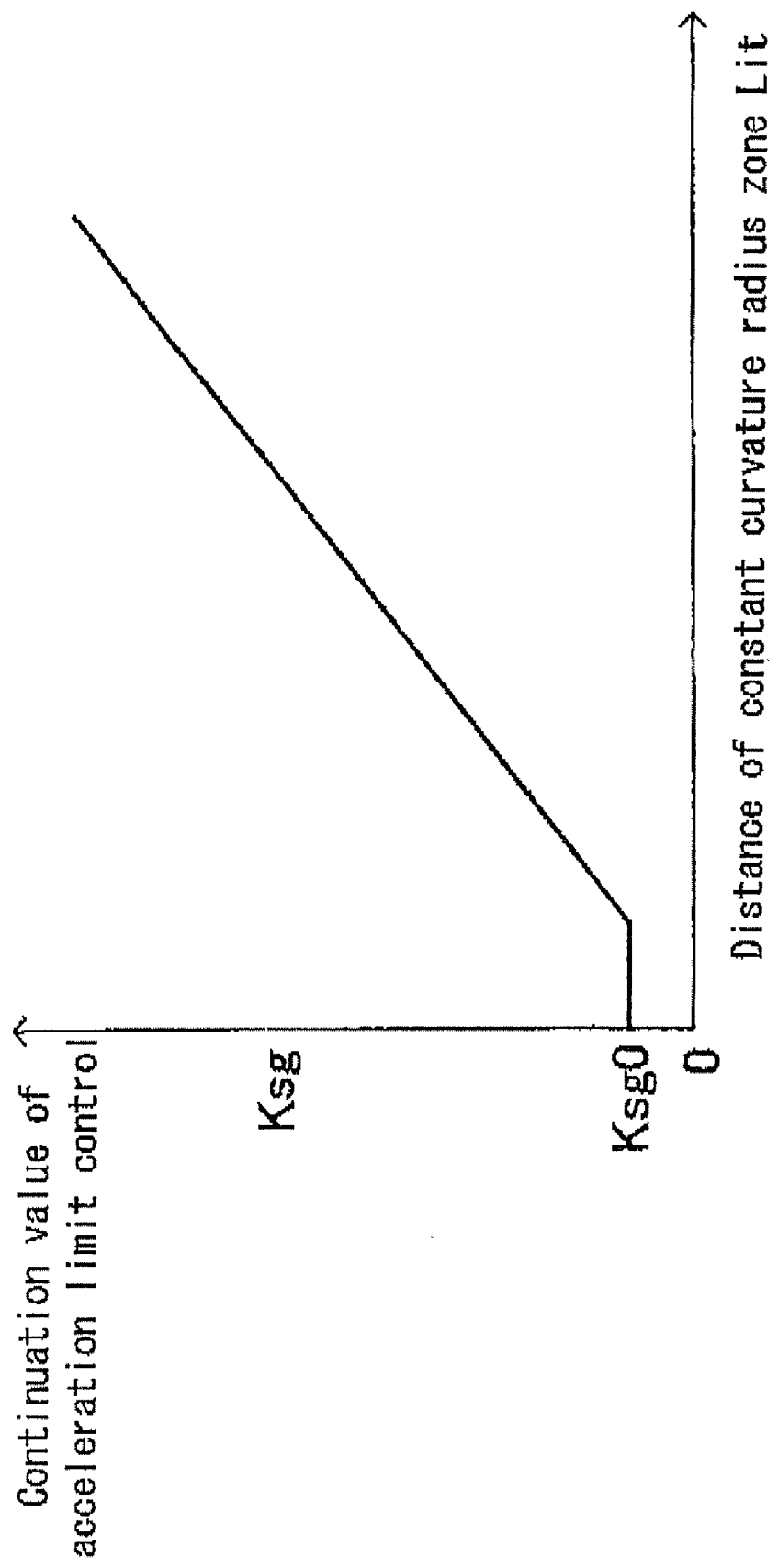
FIG. 10 is a graph illustrating a relationship between a distance of the constant curvature radius zone and a continuation value of an acceleration limit control according to the first embodiment.

The predetermined continuation value Ksg (see FIG. 3) is determined, using a table shown in FIG. 10, to be larger (lower limit value is Ksg0) when a distance of the constant curvature radius zone, i.e., a distance Lit in FIG. 16, is larger. This is because the earlier cancellation of the acceleration limit at a time of the shorter distance Lit reduces the uncomfortable feeling given to the driver by means of the acceleration limit.

Figure 11:
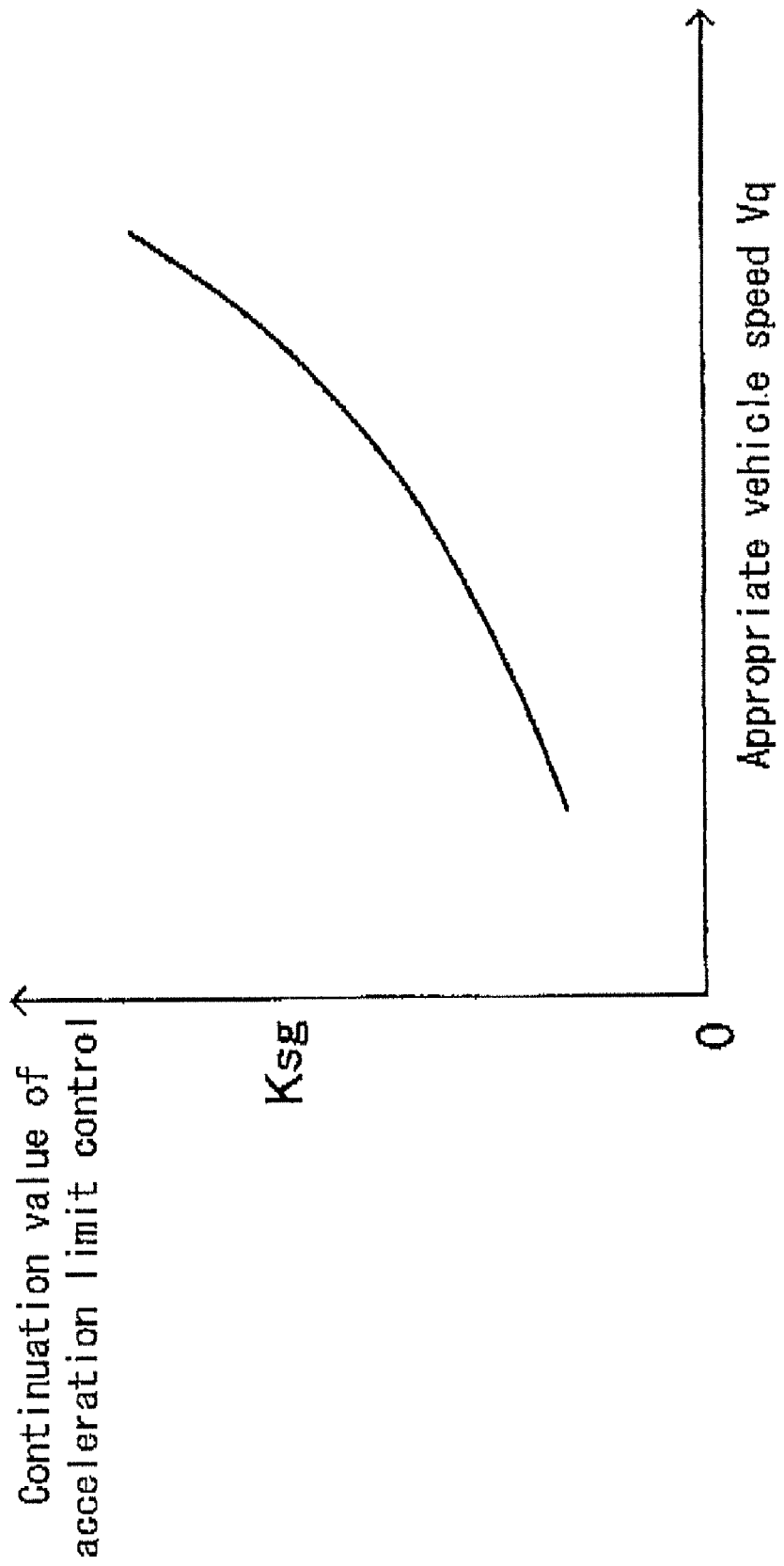
FIG. 11 is a graph illustrating a relationship between the appropriate vehicle speed and the continuation value of the acceleration limit control according to the first embodiment.

The continuation value Ksg is determined, using a table shown in FIG. 11, to be larger when the appropriate vehicle speed Vq is larger. This is based on the fact that, in a case where the acceleration pedal AP is operated before the cancellation of the acceleration limit, the degree of acceleration slip increases on the driving wheel that may occur immediately after the cancellation of the acceleration limit.

Continuation of multiple curves, such as a so-called S-shaped curve and a combined curve, each consisting of the advance transition curve zone, i.e., the transition curve zone on the entrance side, the constant curvature radius zone, and the exit transition curve zone, i.e., the transition curve zone on the exit side, for example, is possibly considered when the vehicle is traveling. In such case, the multiple curves ahead of the vehicle are recognizable according to the present embodiment. For example, as shown in FIG. 12, two curves (first and second curves; the second curve farther away from the vehicle than the first curve has a smaller minimum curvature radius than the first curve) are recognized.

Figure 12:
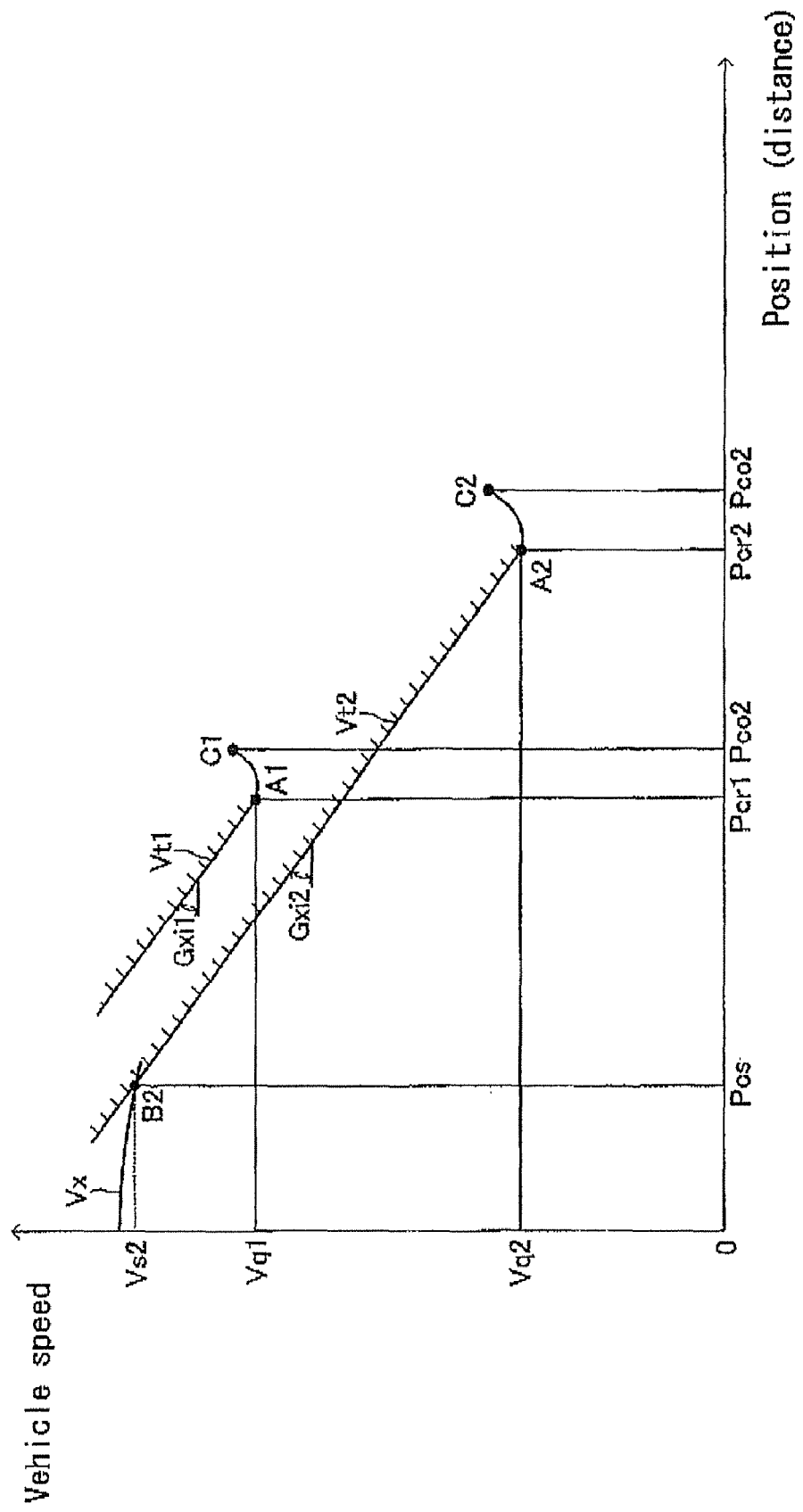
FIG. 12 is a diagram explaining the curve speed reduction control performed when two curves are recognized according to the first embodiment.

As illustrated in FIG. 12, the reference point (Pcr1, Pcr2) and the appropriate vehicle speed (Vq1, Vq2) are determined for each curve. Then, the target vehicle speed characteristic (Vt1, Vt2) is determined on the basis of the related reference point and the appropriate vehicle speed for each curve. The curve speed reduction control is performed on the basis of the target vehicle speed characteristic of which start condition (see FIG. 6) is first satisfied (i.e., Vt2 in FIG. 12). In FIG. 12, the current vehicle speed is reduced from a vehicle speed Vs2 at a point Pcs (B2) according to the curve speed reduction control. As a result, the curve speed reduction control is performed on the basis of the curve for which the vehicle speed reduction is firstly and early required (i.e., the second curve farther away from the vehicle in FIG. 12).

Figure 13:
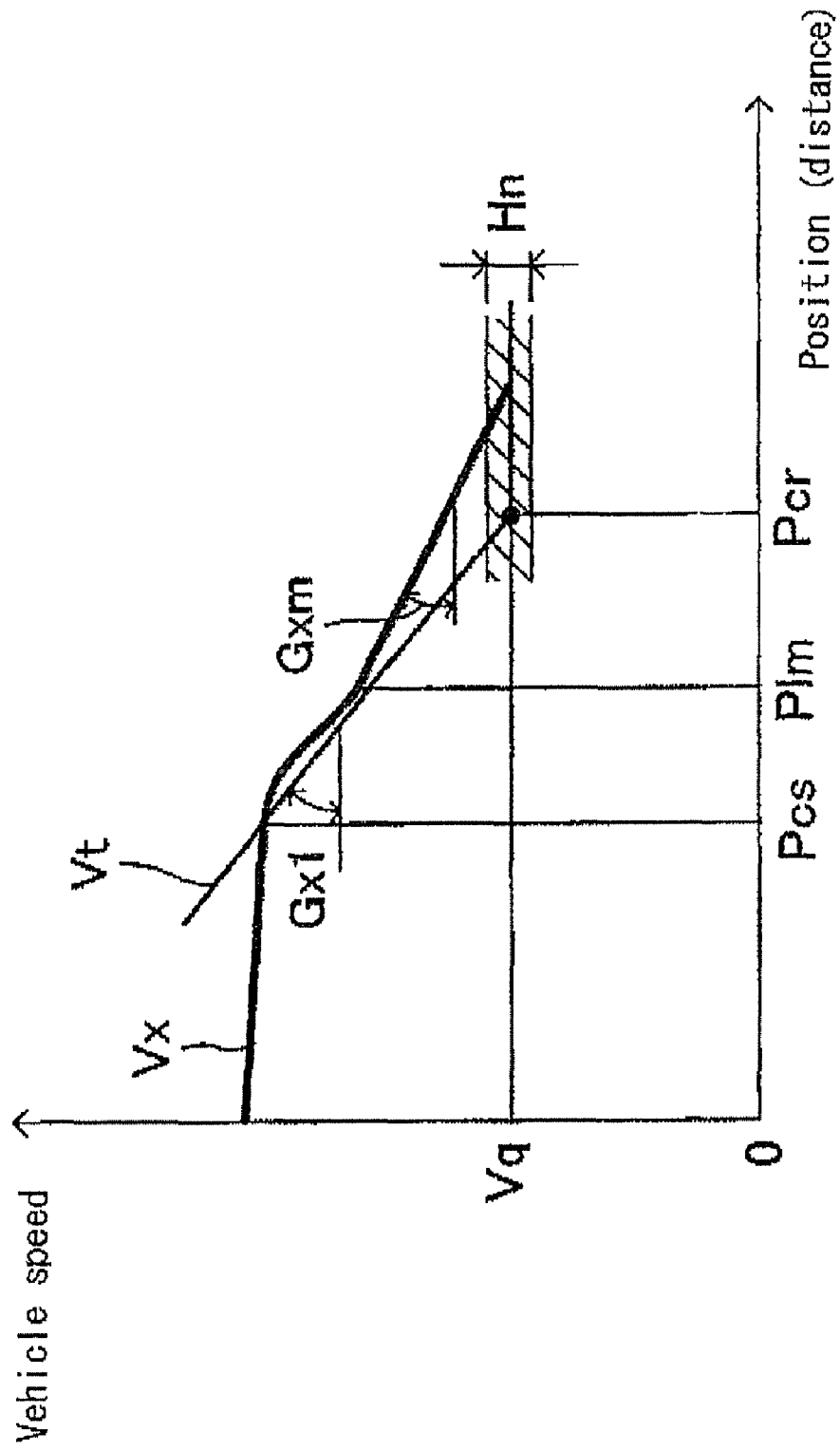
FIG. 13 is a diagram illustrating an example of a case where a road surface friction coefficient decreases during the execution of the curve speed reduction control according to the first embodiment.

In cases where snow, ice, and the like remain within the curve, a friction coefficient on a road surface (i.e., road surface friction coefficient) may decrease. FIG. 13 illustrates a case where the road surface friction coefficient decreases after a point Plm provided between the point Pcs where the curve speed reduction control is stated and the reference point Pcr. Even in such case, the curve speed reduction control is not finished when the vehicle reaches the reference point Pcr and is continued until the vehicle speed Vx enters the small range Hn including the appropriate vehicle speed Vq. Thus, even when the vehicle is driven, passing over the reference point Pcr, the curve speed reduction control is continued and thus the vehicle is securely decelerated to the appropriate vehicle speed Vq.

Figure 14:
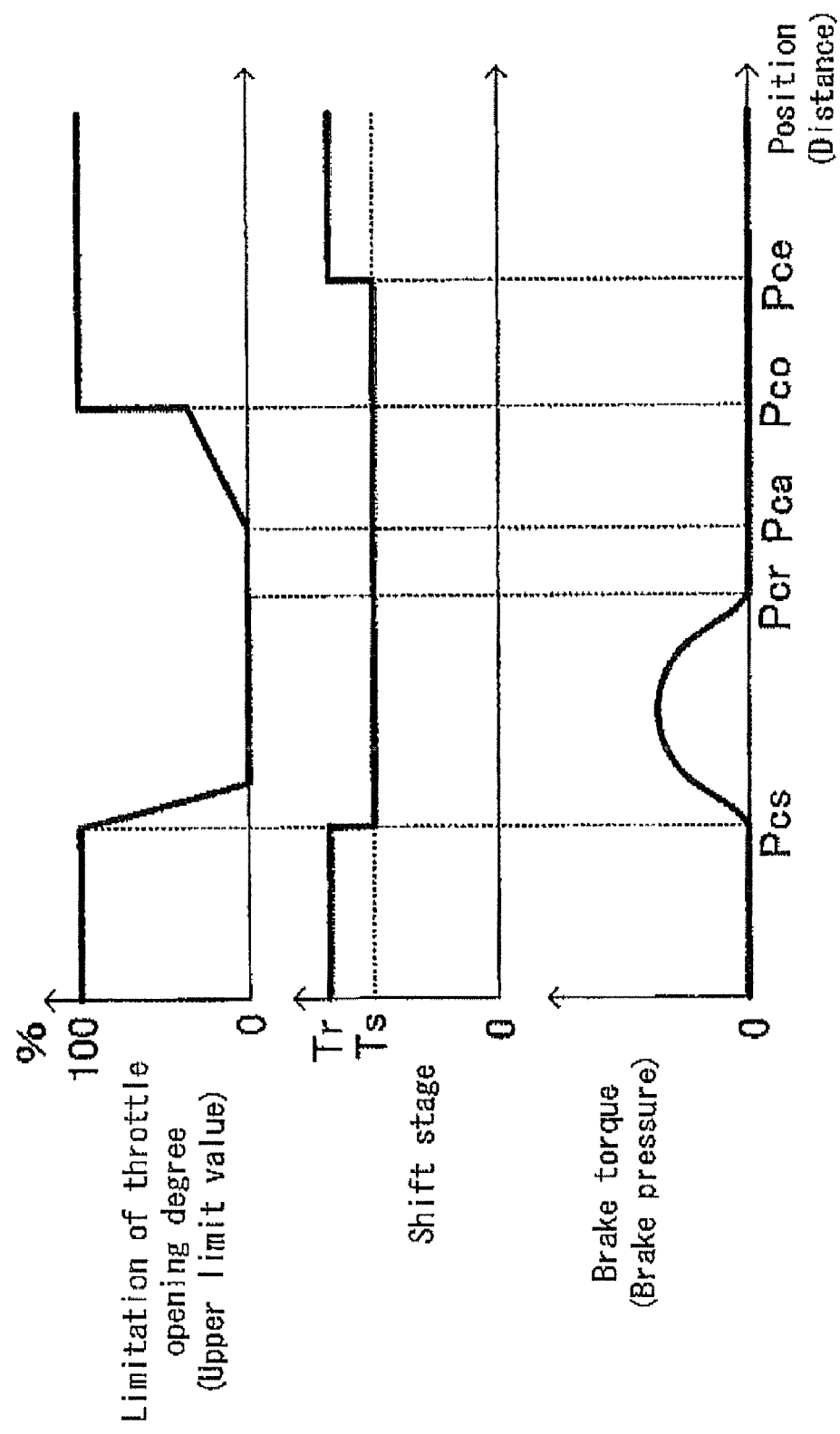
FIG. 14 is a diagram illustrating an example of a case where the curve speed reduction control is performed by the device shown in FIG. 1 according to the first embodiment.

FIG. 14 illustrates an example of a case where the curve speed reduction control is executed by the device. When the vehicle passes over the point Pcs, at which the curve speed reduction control start condition is satisfied, the curve speed reduction control is activated. Accordingly, the limitation of the throttle opening degree (the throttle opening degree does not exceed an upper limit value although the throttle opening degree is allowed up to the upper limit value), the increase of the reduction gear ratio of the transmission TM (downshift from a shift stage Tr to a shift stage Ts), and the application of the brake torque (brake pressure) by the wheel brake are started.

The vehicle is gradually decelerated by the curve speed reduction control. The curve speed reduction control is finished at the point where the vehicle speed Vx approximately matches the appropriate vehicle speed Vq (in the vicinity of the reference point Pcr). Accordingly, while the brake torque of the wheel brake becomes zero (0), the above-described acceleration limit control is continuously stated. Therefore, a limit is set for the throttle opening degree (the upper limit value is equal to zero) until the vehicle passes over the point Pca. Then, the acceleration limit is gradually relaxed and is completely cancelled when the vehicle passes over the point Pco. At this time, the downshifted state of the transmission TM (the shift stage=Ts) is maintained until the vehicle passes the point Pce in preparation for the acceleration operation by the driver. However, in a case where the driver does not conduct the acceleration operation, an upshift from the shift stage Ts to the shift stage Tr is executed.

While the target vehicle speed characteristic Vt is used for the curve speed reduction control start condition as described above, the curve speed reduction control may be performed on the basis of a target deceleration, without using the target vehicle speed characteristic Vt, after the start of the curve speed reduction control. In cases where the difference ΔVx (see FIG. 3) is used for the curve speed reduction control as mentioned above, the deceleration of the vehicle fluctuates microscopically for achieving the target vehicle speed characteristic Vt. Thus, after the determination of the start of the curve speed reduction control by using the target vehicle speed characteristic Vt, the curve speed reduction control (for example, wheel brake pressure control) is performed so that the deceleration of the vehicle matches the target deceleration.

Because the deceleration of the vehicle is directly controlled, the microscopic deceleration change of the vehicle is reduced as compared to a case where the difference ΔVx is used. On the other hand, the point where the vehicle speed Vx substantially matches the appropriate vehicle speed Vq may be possibly away from the reference point Pcr (i.e., an error in the curve speed reduction control). However, even in such case, the curve speed reduction control is finished when the vehicle speed Vx substantially matches the appropriate vehicle speed Vq, thereby securely decreasing the vehicle speed Vx to the appropriate vehicle speed Vq. Further, the reference point Pcr is specified closer to the vehicle relative to the constant curvature radius zone starting point within the curve, thereby absorbing the error in the curve speed reduction control.

Figure 15:
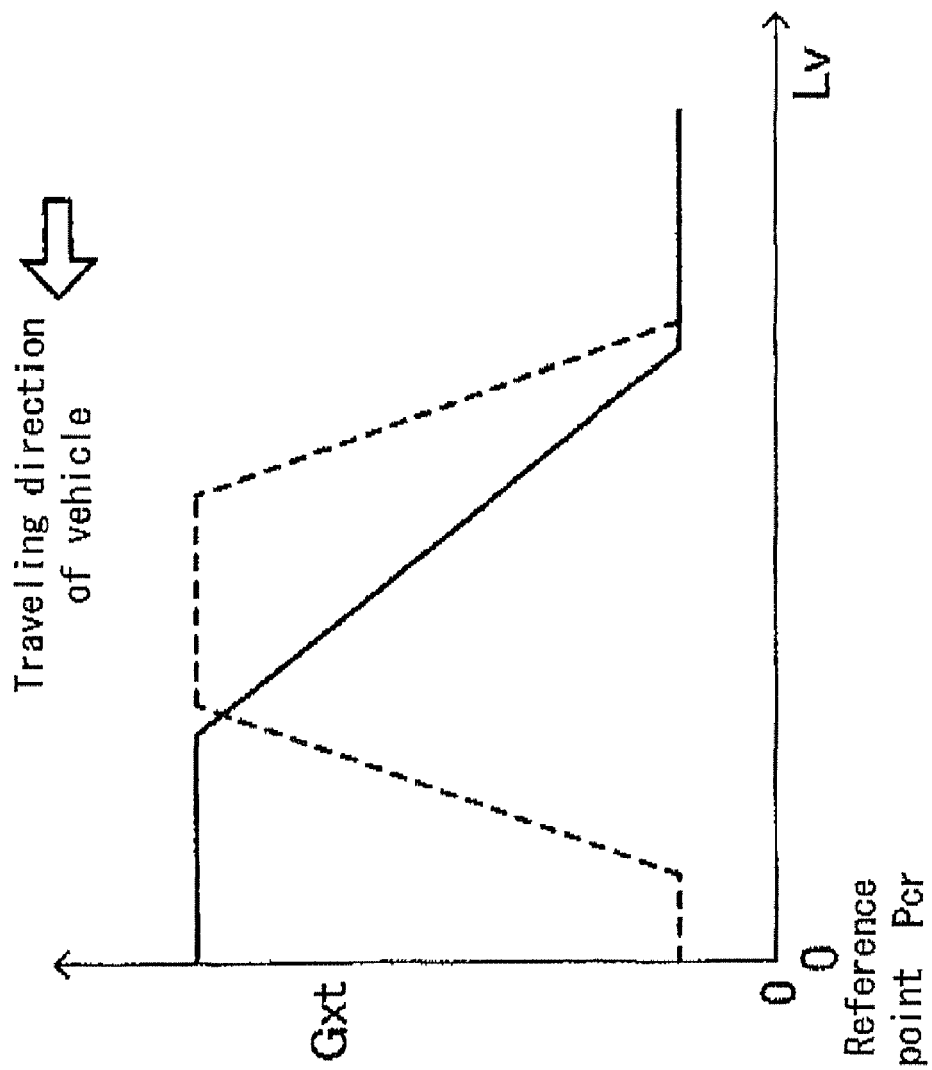
FIG. 15 is a graph illustrating a relationship between a position on the road and a target deceleration in a case where the curve speed reduction control is performed by using the target deceleration according to the first embodiment.

When the curve speed reduction control is performed by using the target deceleration as mentioned above, a target deceleration Gxt is defined on the basis of the distance Lv between the reference point Pcr and the vehicle. As illustrated by a solid line in FIG. 15, the target deceleration Gxt is specified to be a relatively small value immediately after the start of the curve speed reduction control, and thereafter is gradually increasing. Further, as illustrated by a dashed line in FIG. 15, after the increase of the target deceleration Gxt, the target deceleration Gxt may be gradually decreasing while the vehicle is approaching the reference point Pcr. As a result, the same effect as that illustrated in FIG. 8 is obtained. That is, the curve speed reduction control is started with the gentle deceleration and then with the sharp deceleration, which matches a feeling of the driver. Further, the deceleration is reduced in the final stage of the curve speed reduction control, thereby restricting the temporal changes (i.e., jerk) in deceleration.

In cases where the driver operates the brake pedal BP during the curve speed reduction control, the control is finished when a vehicle deceleration required by the driver (i.e., request deceleration Gdr) is greater than a vehicle deceleration Gcv in the curve speed reduction control (Gdr>Gcv; Gdr and Gcv are each positive value). The vehicle is decelerated in accordance with the brake pedal operation by the driver. On the other hand, when the request deceleration Gdr is equal to or smaller than the vehicle deceleration Gcv (Gdr≦Gcv; Gdr and Gcv are each positive value), the curve speed reduction control is continued. This is to maintain and continue the deceleration of the vehicle necessary for driving the vehicle at the appropriate vehicle speed Vq through the curve.

The request deceleration Gdr is determined on the basis of the brake operation variable Bs detected by the brake operation sensor BS. The vehicle deceleration Gcv in the curve speed reduction control is determined on the basis of at least one of the longitudinal acceleration (deceleration) Gx detected by the longitudinal acceleration sensor GX, the deceleration characteristic of the curve speed reduction control such as the deceleration Gxi, the target deceleration Gxt, and the speed reduction control variable Gst.

While the driver is operating the brake pedal BP, the acceleration limit control is not performed after the curve speed reduction control. This is because the limitation on the acceleration slip is not necessary as the acceleration pedal AP is not operated by the driver.

According to the motion control device of the first embodiment, the curve speed reduction control is performed, regardless of the acceleration/deceleration operation by the driver, for the purpose of decreasing the vehicle speed Vx to the appropriate vehicle speed Vq that is achieved at the reference point Pcr (which is equal to, for example, the advance transition curve zone ending point or the closer point to the vehicle relative to the advance transition curve zone ending point) provided in the middle of the curve. The vehicle is therefore appropriately driven through the curve. That is, the curve speed reduction control is performed regardless of whether or not the vehicle advances to the curve.

In addition, when the vehicle is decelerated to the appropriate vehicle speed Vq, the curve speed reduction control is finished regardless of whether or not the vehicle exits from the curve. Accordingly, the curve speed reduction control (specifically, the start timing and the end timing thereof) is likely to meet the intention of the driver in response to the shape of the curve, which results in the decrease of uncomfortable feeling given to the driver by the curve speed reduction control.

Further, the acceleration limit control is continuously performed immediately after the end of the curve speed reduction control for a predetermined time period. Thus, in a case where the driver operates the acceleration pedal AP during the curve speed reduction control, a sudden acceleration (acceleration slip on the driving wheel) that occurs immediately after the end of the curve speed reduction control may be reduced.

Figure 17:
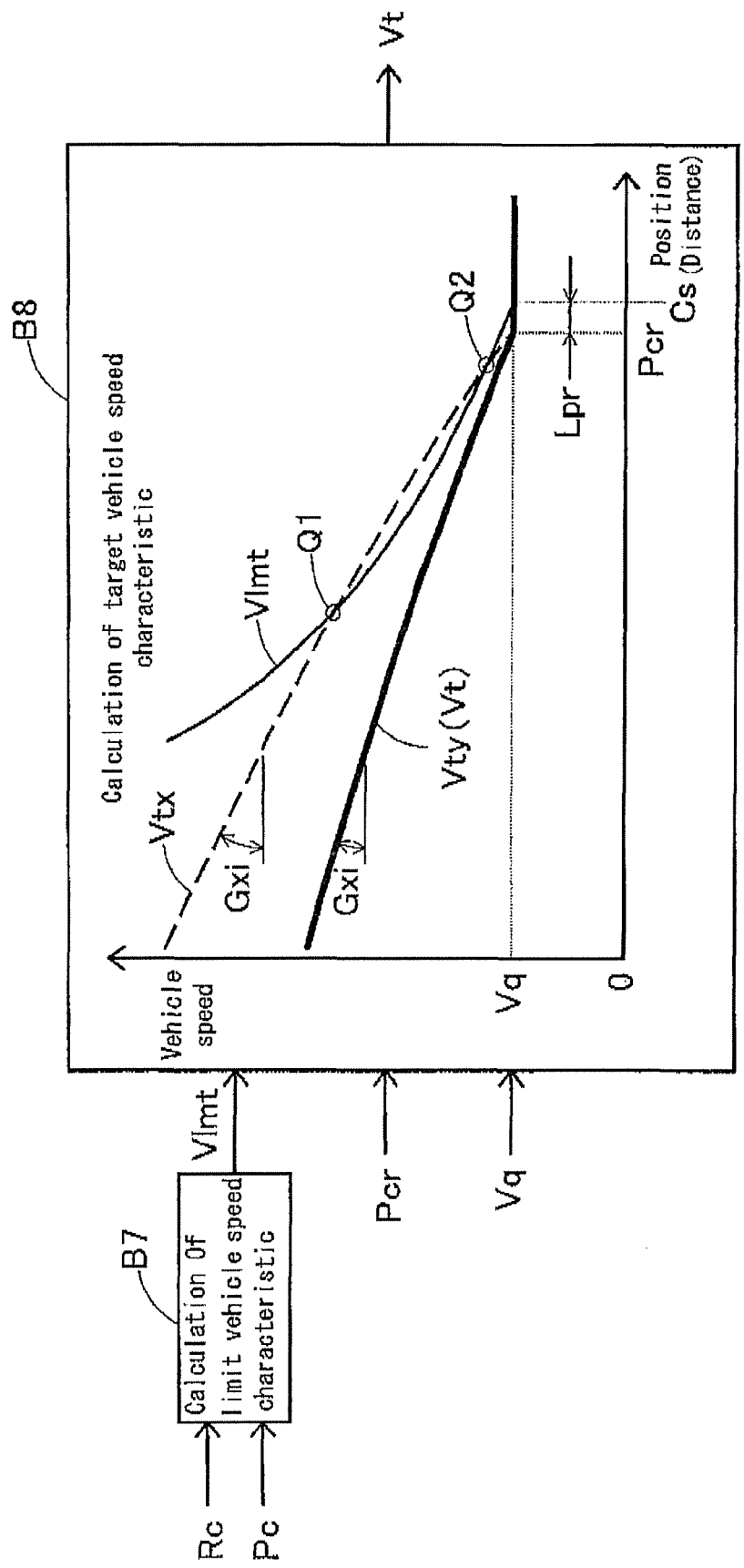
FIG. 17 is a functional block diagram for calculating the target vehicle speed characteristic used for the curve speed reduction control according to the first embodiment.

The target vehicle speed characteristic Vt is specified not to exceed a limit vehicle speed characteristic Vlmt calculated on the basis of the shape of the curve (i.e., curvature radius Rc) so that the vehicle can constantly stably travel through the curve. The target vehicle speed characteristic Vt specified on the basis of the limit vehicle speed characteristic Vlmt will be explained in detail with reference to FIG. 17. A limit vehicle speed characteristic calculating means B7 calculates the limit vehicle speed characteristic Vlmt based on the shape of the curve (i.e., curvature radius Rc), existing immediately ahead of the vehicle, obtained in step A220 in FIG. 2, and the relative position Pc between the curve and the vehicle obtained in step A225 in FIG. 2. For example, the limit vehicle speed characteristic Vlmt is calculated by following an equation 3 shown below.

$$\sqrt{(Gym \cdot Rc)} \qquad \text{Equation 3:}$$

In the above equation, Gym is a maximum lateral acceleration permitted within the curve and is a pre-set value, i.e., a value specified beforehand. In addition, a maximum road surface friction coefficient μmax is estimated and based on which the maximum lateral acceleration Gym is specified. A target vehicle speed characteristic calculating means B8 calculates the target vehicle speed characteristic Vt based on the appropriate vehicle speed Vq determined in step A230 in FIG. 2, the reference point Pcr determined in step A235 in FIG. 2, and the limit vehicle speed characteristic Vlmt. The target vehicle speed characteristic Vt is a characteristic for decelerating the vehicle according to a pre-set deceleration characteristic (for example, deceleration Gxi) on the basis of the appropriate vehicle speed Vq at a point Pcr, as a reference, and is calculated so as not to exceed the limit vehicle speed characteristic Vlmt. In a case where the target vehicle speed characteristic Vt determined on the basis of the reference point Pcr, the appropriate vehicle speed Vq, and the deceleration Gxi is calculated and determined to be a characteristic Vtx (which exceeds the limit vehicle speed characteristic Vlmt) shown by a dotted line in FIG. 17, at least one of the deceleration Gxi and the reference point Pcr is adjusted so that the target vehicle speed characteristic Vt is equal to a characteristic Vty, thereby preventing the target vehicle speed characteristic Vt from exceeding the limit vehicle speed characteristic Vlmt.

The limit vehicle speed characteristic Vlmt is a characteristic of the vehicle speed that reaches the allowable maximum lateral acceleration Gym within the curvature radius that changes along the transition curve (i.e., a clothoid curve) from the curve starting point Ci to the constant curvature radius zone starting point Cs. When the target vehicle speed characteristic Vtx that exceeds the limit vehicle speed characteristic Vlmt is determined, the vehicle is prevented from stably traveling through the curve in a range where the target vehicle speed characteristic exceeds the limit target vehicle speed characteristic (i.e., an area between Q1 and Q2 in FIG. 17). Thus, an adjustment of at least one of the deceleration characteristic (which is adjusted to a smaller value) and the reference point Pcr (which is adjusted to a point closer to the curve starting point Ci) so that the target vehicle speed characteristic Vt is specified not to exceed the limit vehicle speed characteristic Vlmt.

The motion control device according to the present embodiment includes the vehicle speed obtaining means (A215), the curve shape obtaining means (A220), the position obtaining means (A215), the determining means (A230, A235), the calculating means (A240), and the speed reduction controlling means (A245, A250, A255, A260). In the following, a point closer to the vehicle relative to a predetermined point may be referred to as 'a front side'. A point farther from the vehicle relative to the predetermined point may be referred to as 'a back side'. Further, a term 'passing the curve starting point' may be expressed as 'advancing to the curve' A term 'passing the curve ending point' may be expressed as 'exiting from the curve'.

The vehicle speed obtaining means (A215) obtains the speed (Vx) of the vehicle by means of one of known methods, such as a usage of an output of a wheel speed sensor (WS**).

The curve shape obtaining means (A220) obtains the shape (Rc, Rm) of the curve existing ahead of the vehicle on a road on which the vehicle is traveling. The shape (Rc, Rm) of the curve is obtained, for example, from road information stored in a navigation device mounted onto the vehicle.

The position obtaining means (A225) obtains the relative position (Lv) of the vehicle to the curve. The relative position (Lv) is obtained, for example, from road information stored in the navigation device mounted onto the vehicle and a vehicle position acquired from a global positioning system mounted onto the navigation device.

The determining means (A230, A235) determines the reference point (Pcr) in the middle of the curve and the appropriate vehicle speed (Vq) for the vehicle to pass over the reference point (Pcr). The term "in the middle of the curve" indicates a point between the curve starting point (Ci) and the curve ending point (Cd) in the single curve.

As the reference point (Pcr), the ending point (Cs) of the advance transition curve zone (i.e., the starting point of a constant curvature radius zone) or a point closer to the vehicle relative to the ending point (Cs) of the advance transition curve zone is specified. In addition, as for the appropriate vehicle speed (Vq), the larger the minimum curvature radius (Rm) within the curve is, the larger the appropriate vehicle speed (Vq) (i.e., the vehicle can appropriately turn and travel the curve) is specified to be.

The calculating means (A240) calculates, on the basis of the reference point (Pcr) and the appropriate vehicle speed (Vq), the target vehicle speed characteristic (Vt) which is a target of the reduction characteristic of the vehicle speed relative to the position on the road in a case where the vehicle is decelerated on the road between the reference point (Pcr) and a point closer to the vehicle relative to the reference point (upon the vehicle advancing to the curve).

The target vehicle speed characteristic (Vt) has, for example, a property in which the vehicle speed (Vx) becomes the appropriate vehicle speed (Vq) at the reference point (Pcr) and in which the target vehicle speed characteristic (Vt) is increased as being away from the reference point (Pcr) towards the vehicle. The target vehicle speed characteristic (Vt) may be specified so that the deceleration of the vehicle is constant.

The speed reduction controlling means (A245, A250, A255, A260) starts the speed reduction control for decelerating the vehicle in a case where a relationship between the vehicle speed (Vx) and a position of the vehicle relative to the reference point (Pcr) obtained from the position obtaining means (A225) (i.e., a distance (Lv) between the reference point (Pcr) and the vehicle) meets a control start condition determined on the basis of the target vehicle speed characteristic (Vt), and finishes the speed reduction control in a case where the vehicle speed falls within or reaches the predetermined range (Hn) in which the appropriate vehicle speed (Vq) is included (providing the speed reduction control is started).

The control start condition (A250) is satisfied, for example, when the current vehicle speed (Vx) exceeds a vehicle speed at the "current vehicle position relative to the reference point (Pcr)" in the target vehicle speed characteristic (Vt). The width of the aforementioned predetermined range (Hn) may be zero. According to the speed reduction control, the vehicle is decelerated along the target vehicle speed characteristic (Vt). For example, the vehicle speed (Vx) is feedback-controlled so that a difference (ΔVx) between the current vehicle speed (Vx) and the vehicle speed at the "current vehicle position relative to the reference point" in the target vehicle speed characteristic (Vt) turns to zero. Alternatively, using the target deceleration (relative to a position on the road), the deceleration is feedback-controlled so that the current deceleration matches the target deceleration (which may be constant, for example). The deceleration of the vehicle is achieved by a wheel brake, an output reduction of the drive source, a downshift of the transmission (from the upper shift stage to the lower shift stage, an increase of reduction gear ratio), and the like.

According to the motion control device for a vehicle of the present embodiment, the speed reduction control is performed so that the vehicle speed (Vx) is reduced to the appropriate vehicle speed (Vq) at the reference point (Pcr) (for example, the ending point (Cs) of the advance transition curve zone) provided in the middle of the curve regardless of the acceleration/deceleration operation by the driver. In consideration of possibility of a large distance or a small distance between the curve starting point (Ci) and the reference point (Pcr) (including a case where the advance transition curve zone is long), the speed reduction control is started regardless of whether or not the vehicle advances to the curve.

In addition, when the vehicle is decelerated to the appropriate vehicle speed (Vq), the speed reduction control is finished regardless of whether or not the vehicle exits from the curve. Thus, the control or adjustment of the vehicle speed (Vx) depends on the driver after the end of the speed reduction control. As a result, the speed reduction control (specifically, its start timing and end timing) is likely to meet the intention of the driver in response to the shape of the curve, thereby reducing the uncomfortable feeling given to the driver by the speed reduction control.

The motion control device according to the present embodiment may include the acceleration limit controlling means (A265) that limits a degree of acceleration of the vehicle while the vehicle is traveling from the ending point of the speed reduction control for a predetermined time (Ksg), or is traveling by a predetermined distance (Ksg) from the ending point of the speed reduction control.

Accordingly, in a case where the driver has already performed the acceleration operation during the execution of the speed reduction control, for example, the acceleration slip (sudden acceleration) that may occur immediately after the end of the speed reduction control is reduced. The acceleration limit of the vehicle is achieved by limiting the throttle opening degree, for example.

In this case, the aforementioned predetermined time (Ksg) or the predetermined distance (Ksg) is determined on the basis of a distance (Lit) of the constant curvature radius zone within the curve. For example, the longer the distance (Lit) of the constant curvature radius zone is, the longer the predetermined time (Ksg) or the predetermined distance (Ksg) is specified to be. Accordingly, when the distance (Lit) of the constant curvature radius zone is short, the acceleration limit is cancelled at a relatively earlier timing. When the distance (Lit) of the constant curvature radius zone is long, the acceleration limit is cancelled at a relatively later timing. The uncomfortable feeling given to the driver by the acceleration limit may be minimized.

Continuation of multiple curves each consisting of, for example, the advance transition curve zone, the constant curvature radius zone, and the exit transition curve zone, such as a so-called S-shaped curve and a combined curve, is possibly considered while the vehicle is traveling. Alternatively, a straight road zone may be provided between the two curves but may be extremely small. In such case, the curve shape obtaining means (A220) recognizes the multiple curves existing ahead of the vehicle and the shape of each of the curves.

In this case, the determining means (A230, A235) is configured to determine the reference point (Pcr1, Pcr2) and the appropriate vehicle speed (Vq1, Vq2) for each of the curves. The calculating means (A240) calculates, on the basis of the reference point (Pcr1, Pcr2) and the appropriate vehicle speed (Vq1, Vq2) determined for each of the curves, a characteristic which corresponds to the target vehicle speed characteristic (Vt1, Vt2) and based on which the control start condition is satisfied for each of the curves. The characteristic for the control start condition that is satisfied at the earliest timing is used as the target vehicle speed characteristic (Vt1, Vt2) used by the speed reduction controlling means.

Accordingly, the speed reduction control is performed on the basis of the curve for which the speed reduction is required earlier than the other curves.

Furthermore, according to the motion control device of the present embodiment, the target vehicle speed characteristic (Vt) may include a property in which the deceleration of the vehicle increases at a first-half of the speed reduction control, and/or a property in which the deceleration of the vehicle decreases at a second-half of the speed reduction control.

Accordingly, after the start of the speed reduction control, the vehicle is relatively gently decelerated at first. Then, the deceleration of the vehicle gradually increases. Afterwards, the deceleration decreases so that the speed reduction control is finished in a state where the vehicle is relatively gently decelerated. As a result, temporal changes in deceleration (i.e., jerk) become small, thereby further reducing the uncomfortable feeling given to the driver by the speed reduction control.

When the target deceleration (Gx1a, Gx1b, Gx1c) is used in the speed reduction control as mentioned above, the target deceleration is specified on the basis of a position on the road so as to include a property in which the deceleration of the vehicle increases at a first-half of the speed reduction control, and/or a property in which the deceleration of the vehicle decreases at a second-half of the speed reduction control.

According to the motion control device of the present embodiment, the limit vehicle speed calculating means (B7) for calculating the limit vehicle speed characteristic (Vlmt) based on the shape (Rc, Rm) of the curve obtained by the curve shape obtaining means (A220) is provided. The limit vehicle speed calculating means (B7) calculates the target vehicle speed characteristic (Vt) to be equal to or smaller than the limit vehicle speed characteristic (Vlmt). Consequently, the vehicle can stably travel through the curve.

Next, a second embodiment of the motion control device for a vehicle will be explained below. The motion control device according to the second embodiment has the same configuration as that of the first embodiment.

[Curve Travel Control]

A curve travel control performed by the device according to the second embodiment will be explained below. The second embodiment corresponds to Claims 11 to 14. The device performs, as the curve travel control, a travel assistance control serving as a first control and a limit protection control serving as a second control. The travel assistance control is provided for assisting the deceleration operation performed by the driver. The limit protection control is provided for ensuring the traveling stability of the vehicle in the vicinity of a turning limit thereof so that a turning level (state) of the vehicle is prevented from exceeding the turning limit regardless of the acceleration or deceleration operation by the driver.

The first and second controls are both regarded as a speed reduction control for reducing the speed of the vehicle (i.e., for decelerating the vehicle). The speed reduction (i.e., deceleration) of the vehicle is achieved by means of at least one of an output reduction of the engine EG, a downshift of the automatic transmission TM, and a wheel brake. Hereinafter, the first and second controls are both referred to as the curve travel control.

In the curve travel control, a point, at which the speed reduction is started, is determined on the basis of a speed of the vehicle (vehicle speed) Vx, a shape of the curve existing immediately ahead of the vehicle, and a relative position between the curve and the vehicle (i.e., a position of the vehicle relative to the curve, a distance between the curve and the vehicle). The speed reduction is started when the vehicle reaches the point determined. The speed reduction is ended when the vehicle speed Vx becomes appropriate.

Figure 19:
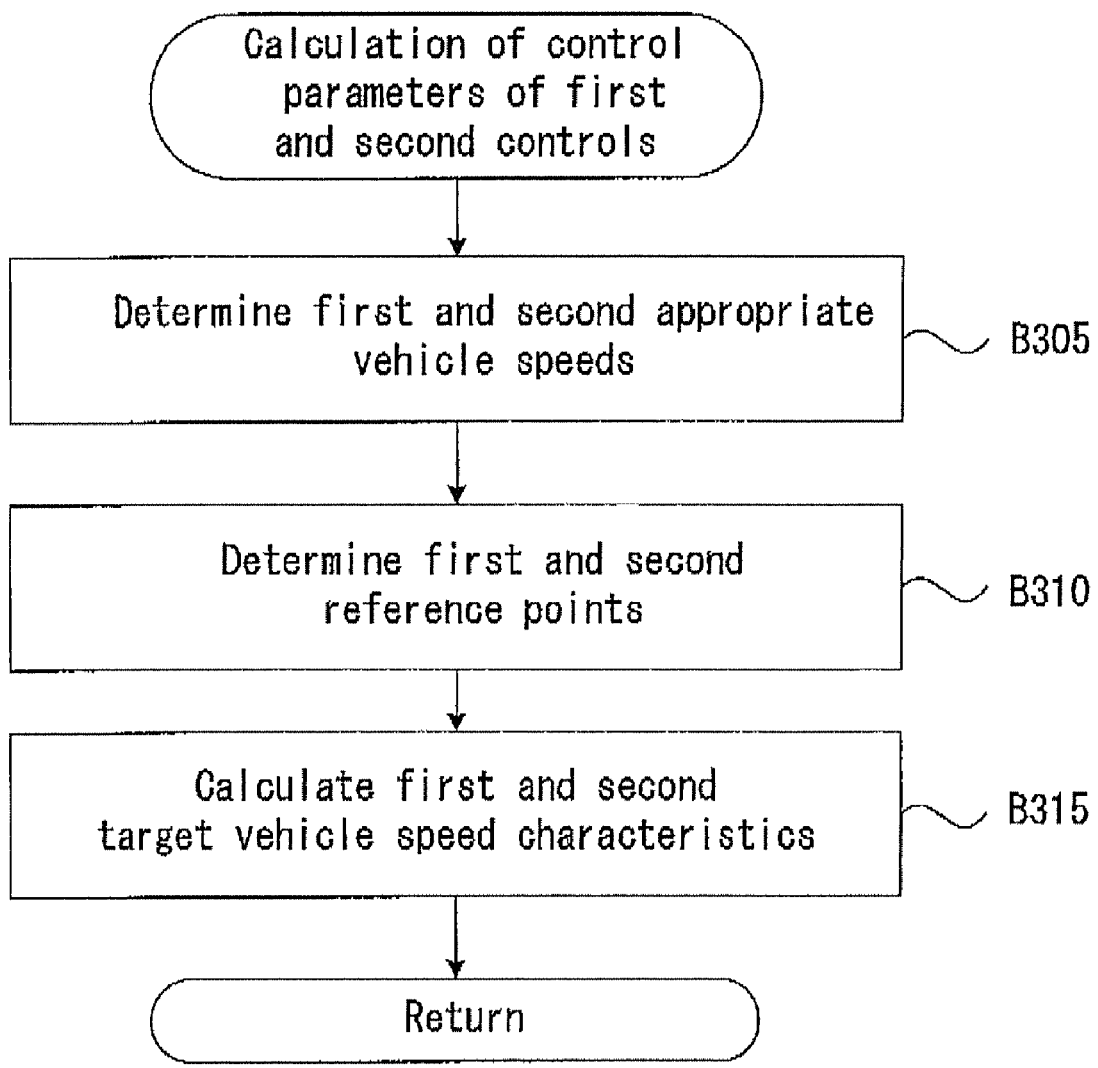
FIG. 19 is a flowchart illustrating a routine for control parameters of first and second controls performed by the electronic control unit provided at the device shown in FIG. 1 according to the second embodiment.
Figure 20:
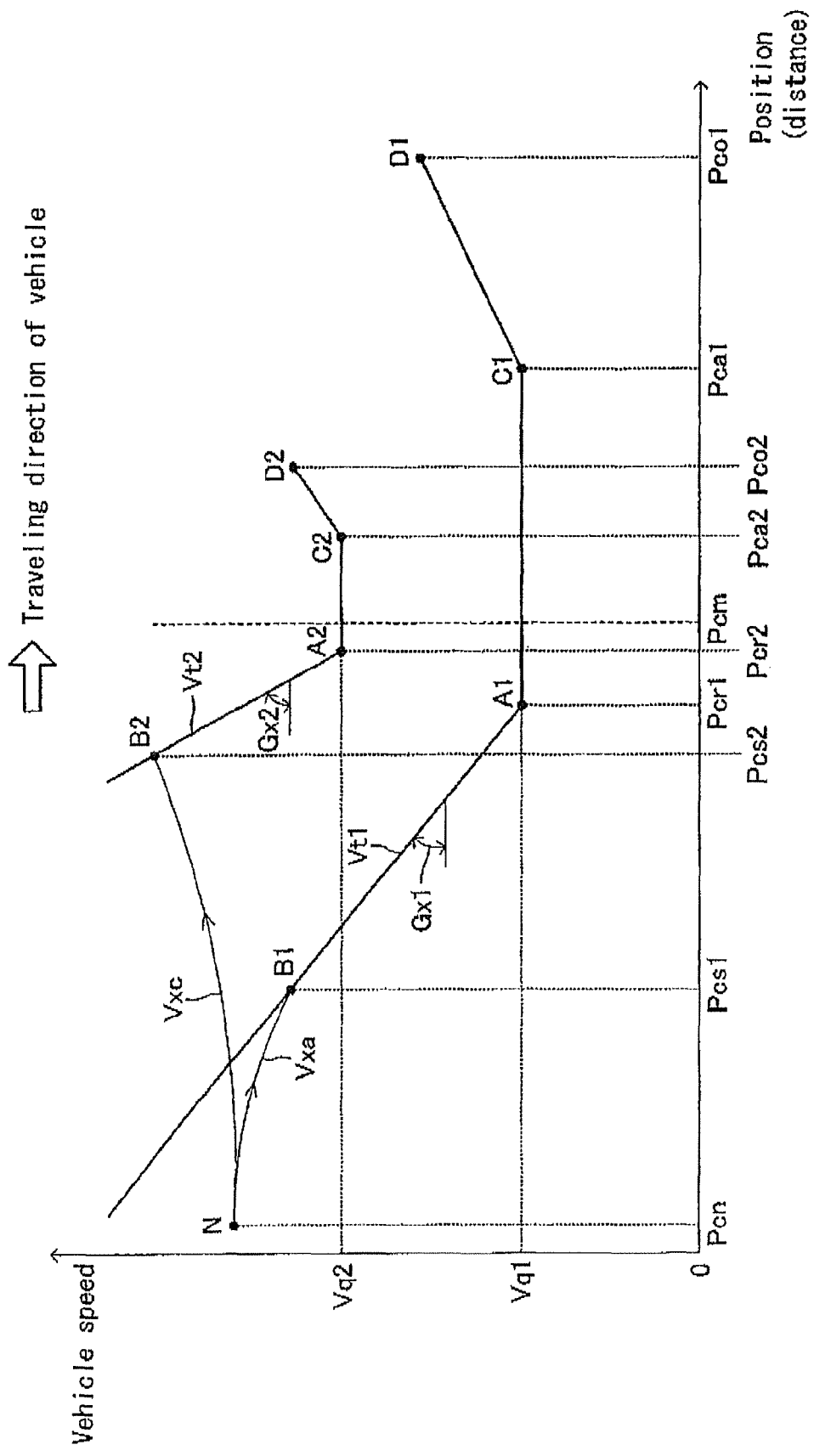
FIG. 20 is a graph illustrating an example of a relationship between the position of the vehicle on the road and the curvature radius of the curve according to the second embodiment.

The curve travel control is described in more detail below with reference to routines illustrated by flowcharts of FIGS. 18, 19 and a diagram of FIG. 20 illustrating a relationship between the position of the vehicle on the road and the vehicle speed. The routines illustrated in FIGS. 18 and 19 are executed at, for example, every predetermined operation period.

As illustrated in FIG. 16, generally on a road, a curve includes an advance transition curve zone, a constant curvature radius zone, and an exit transition curve zone in this order towards a curve ending point (curve exit) from a curve staring point (curve entrance). The transition curve is, for example, structured by a clothoid curve. The transition curve zone is provided so that the vehicle smoothly travels through the curve while the driver gradually steers the steering wheel and then returns the steering wheel without an abrupt operation thereof.

Accordingly, in the following, the curve illustrated in FIG. 16 is assumed to be passed through by the vehicle. In this embodiment, a point closer to the vehicle relative to a predetermined point may be referred to as 'a front side'. A point farther from the vehicle relative to the predetermined point may be referred to as 'a back side'. Further, a term 'passing the curve starting point' may be expressed as 'advancing to the curve'. A term 'passing the curve ending point' may be expressed as 'exiting tom the curve'.

Figure 18:
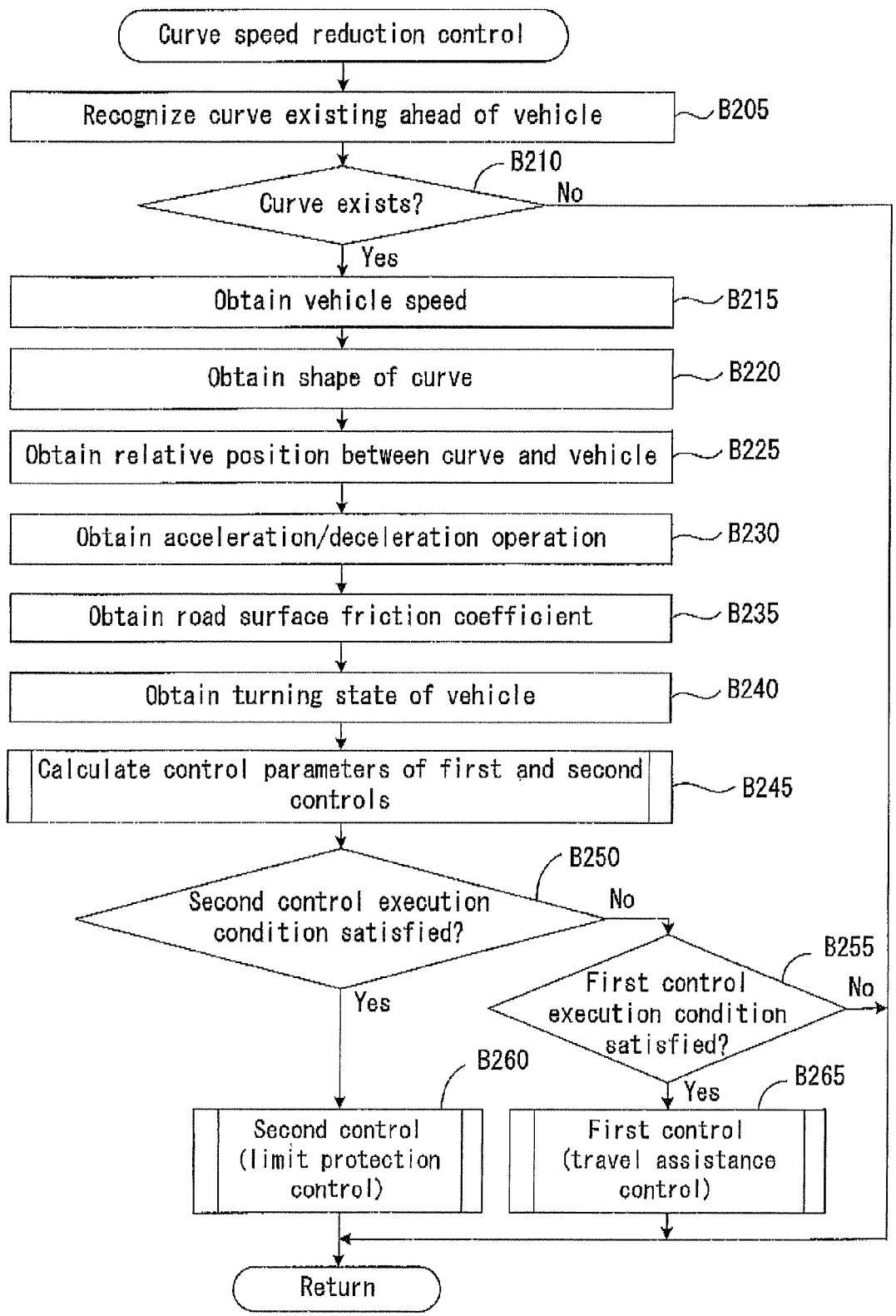
FIG. 18 is a flowchart illustrating a routine for a curve travel control performed by the electronic control unit provided at the device shone in FIG. 1 according to the second embodiment.

Firstly, in step B205 in FIG. 18, a process for recognizing a curve existing immediately ahead of the vehicle (i.e., curve recognition process) is executed. The curve recognition process is executed by at least one of the navigation device NAV and an image recognition device. For example, the presence of the curve is recognized once the vehicle approaches a range within a predetermined distance from the curve.

In step B210, the electronic control unit ECU determines whether or not the curve exists. In a case where the existence of the curve is not recognized, the routine illustrated in FIG. 18 is ended. On the other hand, in a case where the existence of the curve is recognized (see a point Pcn (point N) in FIG. 20), the processes following step B215 are executed.

In step B215, the current vehicle speed Vx is obtained. In step B220, the shape of the curve existing immediately ahead of the vehicle is obtained. In step B225, the relative position between the vehicle and the curve, whose shape is obtained in step B220, is obtained. Such information (i.e., the current vehicle speed Vx, the shape of the curve, and the relative position between the vehicle and the curve) may be obtained via the network within the vehicle. The aforementioned steps B215, B220, and B225 serve as a vehicle speed obtaining means, a curve shape obtaining means, and a position obtaining means, respectively.

The shape of the curve (curvature radius Rc) may be estimated on the basis of curve information included in the aforementioned map information stored in the storage portion MAP. More specifically, positions such as the curve starting point and the curve ending point, and the curvature radius of each position are preliminarily memorized in the map information. In addition, positions of plural predetermined points on the road (node points) and the curvature radius of each position are memorized in the map information. As illustrated in FIG. 4, the curvature radius Rc of the curve may be estimated on the basis of an approximated curve formed by geometrically and smoothly connecting the aforementioned plural points. The detailed explanation of estimation of the curvature radius Rc of the curve based on the approximated curve is disclosed in JP3378490B.

A relative position Pc between the curve and the vehicle is obtained by using the vehicle position detecting means GPS of the navigation device NAV and the map information. More specifically, the current vehicle position (latitude, longitude and the like) on the coordinates fixed on the earth (terrestrial coordinates) is detected by the vehicle position detecting means GPS and the detected current vehicle position is set as an initial position of the vehicle. Then, after the initial position of the vehicle is determined by the vehicle position detecting means GPS, the relative position of the vehicle from the initial position is sequentially updated on the basis of information obtained from the yaw rate gyro GYR, the longitudinal acceleration sensor GX, the lateral acceleration sensor GY, the wheel speed sensor WS** and the like. The current vehicle position is estimated accordingly. The map information includes a position of each road (latitude and longitude). Hence, by referring to the current vehicle position and the position of the road, the relative position Pc between the curve and the vehicle is obtained.

Further, the relative position Pc between the curve and the vehicle, and the shape of the curve (the curvature radius Rc of the curve) may be obtained by using an image processing of a charge-coupled device (CCD) camera mounted on the vehicle. More specifically, a white line on the road or an edge portion of the road is detected on the basis of an image captured by a stereo camera mounted on the vehicle. Then, a distance distribution on the entire image is calculated on the basis of an offset amount of the corresponding positions in the stereo image and a principle of triangulation. Accordingly, the distance from the vehicle to the curve (i.e., a relative distance Pc between the curve and the vehicle) and the curvature radius Rc of the curve are obtained on the basis of the calculation results. The above-described method of obtaining the relative position between the vehicle and the curve, and the shape of the care are disclosed in more detail in JP3379490B.

In step B230, the acceleration/deceleration operation by the driver is obtained. The acceleration/deceleration operation is obtained on the basis of operation variables Ap and Bp of the acceleration operation member (acceleration pedal AP) and the brake operation member (brake pedal BP), respectively. The acceleration operation is obtained or determined when the operation variable Ap is equal to or greater than a predetermined value Ap1. The deceleration operation is obtained or determined when the operation variable Ap is equal to or smaller than a predetermined value Ap2 (including Ap=0 (release of the acceleration pedal AP), and/or when the brake pedal BP is operated (Bp>0). The brake operation is obtained or determined when the operation variable Bp is equal to or greater than a predetermined value Bp1. The aforementioned step B230 serves as a deceleration operation obtaining means.

In step B235, a road surface friction coefficient μ is obtained. As the road surface friction coefficient μ, a value on the communication bus CB obtained through the aforementioned network, or a value calculated by utilizing one of known methods is used. The step B235 serves as a friction coefficient obtaining means.

In step B240, a turning state (level) of the vehicle is obtained. Specifically, the turning state of the vehicle is obtained on the basis of signals from the steering wheel angle sensor SA, the yaw rate sensor YR, the lateral acceleration sensor GY, and the like.

In step B245, control parameters of the first and second controls are calculated by the execution of the routine illustrated in FIG. 19. Hereinafter, any terms following "the first" and "the second" are related to the first control (i.e., travel assistance control) and the second control (i.e., limit protection control), respectively. In addition, any variables, symbols, and the like followed by "1" and "2" are related to the first control and the second control, respectively. Further, as for any portions where distinction between the first control and the second control is not necessary, "the first" and "the second" may be omitted from the aforementioned terms and "1" and "2" are also omitted from the aforementioned variables, symbols, and the like.

Figure 21:
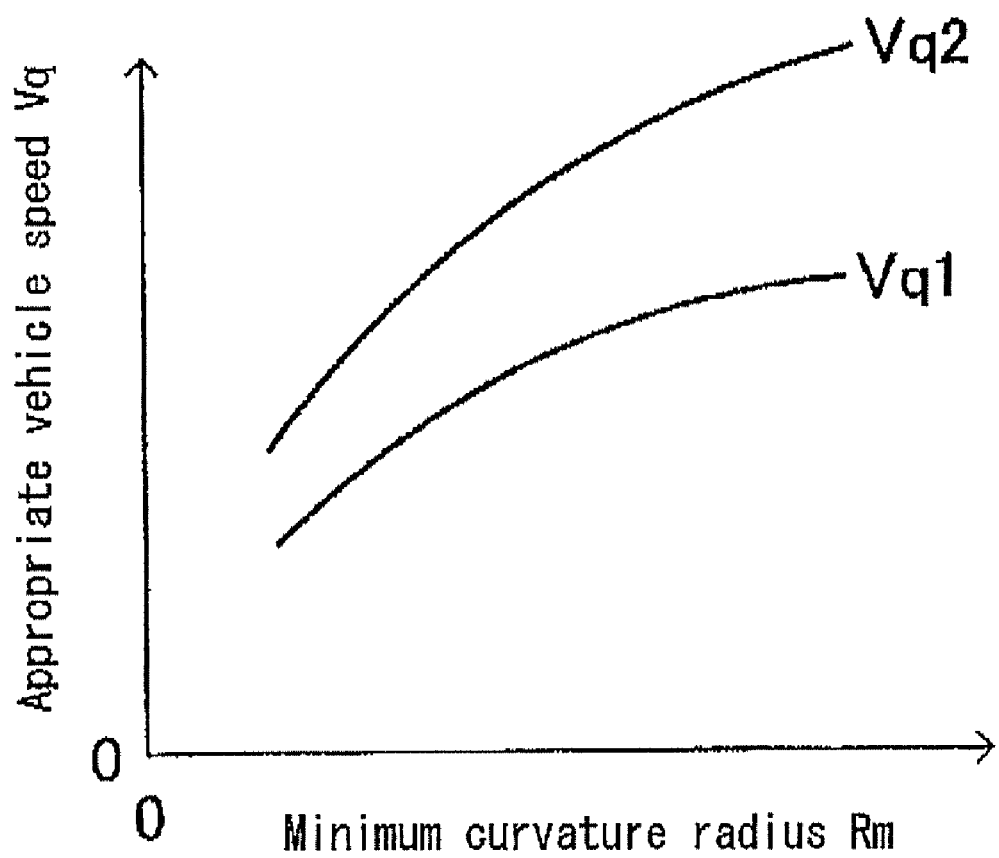
FIG. 21 is a graph illustrating a relationship between the minimum curvature radius and first and second appropriate vehicle speeds according to the second embodiment.

In step B305 in FIG. 19, first and second appropriate vehicle speeds Vq1 and Vq2 are calculated on the basis of the curvature radius of the curve (minimum curvature radius Rm within the curve, for example) (see FIG. 20). The appropriate vehicle speeds Vq1 and Vq2 are specified to be larger, by using a table illustrated in FIG. 21 when the minimum curvature radius Rm is larger. The aforementioned step B305 senses as first and second determining means.

The second appropriate vehicle speed Vq2 is specified larger than the first appropriate vehicle speed Vq1. This is because the first control has a property of simulating a predictive driving by the driver accompanied by the deceleration operation while the second control has a property of an emergency braking for preventing the vehicle from exceeding the tuning limit when the vehicle is driving through the curve.

The first and second appropriate vehicle speeds Vq1 and Vq2 are calculated, by following equations 1 and 2 shown below, on the basis of first and second allowable lateral accelerations Gy1 and Gy2. In the equations 1 and 2, Rm is a minimum curvature radius within the curve. The first allowable lateral acceleration Gy1 is specified in a range from 20% to 30% of the road surface friction coefficient μ. In a case where the road surface is dry asphalt, the first allowable lateral acceleration Gy1 is specified in a range from 0.2 G to 0.3 G. The second allowable lateral acceleration Gy2 is specified in a range from 70% to 80% of the road surface friction coefficient μ. In a case where the road surface is dry asphalt, the second allowable lateral acceleration Gy2 is specified in a range from 0.6 G to 0.7 G. Accordingly, the smaller the road surface friction coefficient μ is, the smaller the first and second appropriate vehicle speeds Vq1 and Vq2 are specified to be.

$$Vq1 = \sqrt{(Gy1 \cdot Rm)} \quad \text{Equation 1:}$$

$$Vq2 = \sqrt{(Gy2 \cdot Rm)} \quad \text{Equation 2:}$$

In step B310, first and second reference points Pcr1 and Pcr2 are determined (see FIG. 20). The first and second reference points Pcr1 and Pcr2 are target points at which the first and second appropriate vehicle speeds Vq1 and Vq2 are achieved, respectively. The first and second reference points Pcr1 and Pcr2 are determined on the basis of the constant curvature radius zone starting point (or a point closest to the vehicle within a zone of the minimum curvature radius Rm) Pcm within the curve (see FIG. 20). The aforementioned step B310 also serves as the first and second determining means.

The point Pcm corresponds to the constant curvature radius zone staring point Cs (which is equal to the advance transition curve zone ending point) in FIG. 16. The constant curvature radius zone staring point Cs may be equal to a point Cs1 in FIG. 4 (i.e., a point corresponding to a node point existing at the front-most side within the constant curvature radius zone that is obtained on the basis of the approximated curve formed by geometrically and smoothly connecting the plural node points) or a point Cs2 in FIG. 4 (i.e., a starting point (a peripheral node at the front side) of the constant curvature radius zone obtained from the approximated curve).

The first and second reference points Pcr1 and Pcr2 are provided at the front side of the point Pcm, i.e., provided closer to the vehicle relative to the point Pcm. This is because to bring the vehicle to further stably travel through the curve by means of an early deceleration of the vehicle to the appropriate vehicle speeds Vq1 and Vq2. In addition, the first reference point Pcr1 is provided at the front side of the second reference point Pcr2. This is because, as in the explanation above, the first control has a property of simulating a predictive driving by the driver accompanied by the deceleration operation while the second control has a property of an emergency braking for preventing the vehicle from exceeding the tuning limit when the vehicle is driving through the curve. For example, the first reference point Pcr1 is provided at the front side of the curve starting point Ci while the second reference point Pcr2 is specified in the advance transition curve zone (between the point Ci and the point Cs).

In step B315, as illustrated by a line A1-B1 and a line A2-B2 in FIG. 20, a first target vehicle speed characteristic Vt1 and a second target vehicle speed characteristic Vt2 in a case where the vehicle is decelerated according to pre-set deceleration characteristics, i.e., decelerated at a first deceleration Gx1 and a second deceleration Gx2, respectively, are calculated on the basis of the first and second appropriate vehicle speeds Vq1 and Vq2 at the reference points Pcr1 and Pcr2 each as a reference. The aforementioned step B315 serves as first and second calculating means.

As illustrated in FIG. 20, the target vehicle speed characteristic Vt1 (Vt2) is a target of a reduction characteristic of the vehicle speed relative to the vehicle position on the road (on the advance transition curve zone). The first (second) target vehicle speed characteristic Vt1 (Vt2) has a property in which the vehicle speed becomes the appropriate vehicle speed Vq1 (Vq2) at the reference point Pcr1 (Pcr2) and in which the target vehicle speed characteristic Vt1 (Vt2) is increased as being away from the reference point Pcr1 (Pcr2) towards the vehicle. Illustrated in FIG. 20 is a case where each of the deceleration characteristics is constant. In this case, more properly, the line A1-B1 and the ling A2-B2 each form an upwardly convex curve. However, each of the lines A1-B1 and A2-B2 is expressed as a straight line in order to facilitate understanding.

The second deceleration Gx2 (deceleration characteristic of the second control) is specified to be larger than the first deceleration Gx1 (deceleration characteristic of the first control). This is because, same as the case for the aforementioned appropriate vehicle speeds Vq1 and Vq2, the first control has a property of simulating a predictive driving by the driver accompanied by the deceleration operation while the second control has a property of an emergency braking.

The first and second decelerations Gx1 and Gx2 are each pre-set constant value. In addition, in the same way as for the aforementioned allowable lateral accelerations Gy1 and Gy2, the first deceleration Gx1 is specified in a range from 20% to 30% of the road surface friction coefficient μ, In a case where the road surface is dry asphalt, the first deceleration Gx1 is specified in a range from 0.2 G to 0.3 G. The second deceleration Gx2 is specified in a range from 70% to 80% of the road surface friction coefficient μ. In a case where the road surface is dry asphalt, the second deceleration Gx2 is specified in a range from 0.6 G to 0.7 G. Accordingly, the smaller the road surface friction coefficient μ is, the smaller the first and second decelerations Gx1 and Gx2 are specified to be.

By referring to FIG. 18, in step B250 after step B245, it is determined whether or not a second control execution condition is satisfied. When the second control execution condition is not satisfied (i.e., negative determination is made in step B250), then it is determined whether or not a first control execution condition (first control permission condition, deceleration operation, and turning state) is satisfied in step B255. On the other hand, when the positive determination is made in step B250, the second control (limit protection control) is started and executed in step B260. When the positive determination is made in step B255, the first control (travel assistance control) is started and executed in step B265. The step B260 serves as a second controlling means and the step B265 serves as a first controlling means.

Accordingly, in cases where the execution conditions for the first and second controls are both satisfied, the second control of which degree of demand is higher is given priority. That is, when the second control execution condition is satisfied while the first control is being performed, the control is switched from the first control to the second control. On the other hand, when the second control is started and executed, the first control is not performed.

The first control execution condition will be explained below. The first control execution condition is satisfied when the deceleration operation is performed by the driver and the turning level (state) of the vehicle is small (i.e., turning state quantity is equal to or smaller than a predetermined value) in addition to the satisfaction of the first control permission condition. The deceleration operation is included in the execution condition because the first control is provided for assisting the deceleration operation by the driver. In addition, the turning level of the vehicle is included in the execution condition for the purpose of avoiding a change in operation of the vehicle by means of the deceleration control with the large turning level. The turning state quantity is calculated on the basis of at least one of the steering wheel angle, the yaw rate, and the lateral acceleration.

Figure 22:
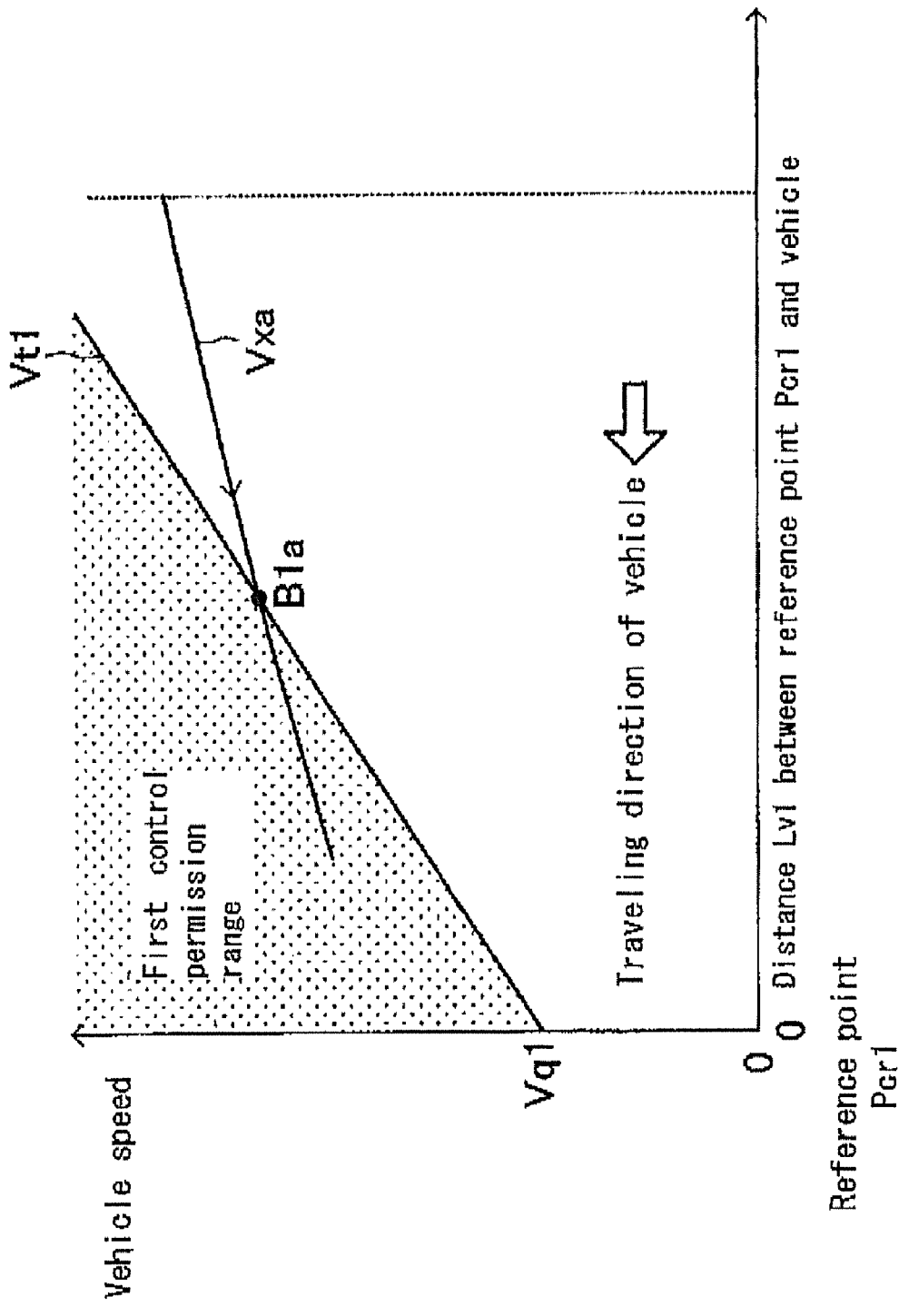
FIG. 22 is a diagram explaining a first control permission condition according to the second embodiment.

As illustrated in FIG. 22, the first control permission condition is determined on the basis of the relative distance between the curve and the vehicle, i.e., a distance Lv1 between the first reference point Pcr1 and the vehicle (which corresponds to the current vehicle position relative to the first reference point Pcr1), and the vehicle speed Vx. The distance Lv1 being zero (Lv1=0) indicates the first reference point Pcr1, In FIG. 22, the first control permission condition is satisfied in a range provided at an upper left side of the first target vehicle speed characteristic Vt1 shown by fine dots (i.e., first control permission range).

While the vehicle is approaching the curve, the distance Lv1 is decreasing and the vehicle speed Vx is changing in response to an operating status of the driver. Then, a point (Lv1, Vx) moves on a coordinate plane illustrated in FIG. 22. When the point (Lv1, Vx) passes over the first target vehicle speed characteristic Vt1 in the leftward direction in FIG. 22, the first control permission condition is satisfied. Accordingly, when the deceleration operation is performed (i.e., the operation variable Ap of the acceleration pedal AP is equal to or smaller than the predetermined value Ap2 (including a release of the acceleration pedal) and/or the operation variable Bp of the brake pedal BP is greater than the predetermined value Bp1) and when the turning level is equal to or smaller than the predetermined value (turning state quantity is equal to or smaller than the predetermined value) in a state where the point (Lv1, Vx) positioned within the first control permission range, the first control is started and executed.

For example, when the point (Lv1, Vx) passes over the first target vehicle speed characteristic Vt1 while moving in the lower left direction in FIG. 22 because a vehicle speed Vxa is reduced by the deceleration operation with the predetermined tuning level or less (for example, substantially straight-ahead driving) (see point B1a), the first control is started at this time. Even when the point (Lv1, Vx) is within the first control permission range, the first control is not started unless the deceleration operation is performed and the turning level is within the predetermined value. However, even in a case where the first control is not started because the deceleration operation is not performed and the turning level is not within the predetermined value, the first control is started if thereafter the deceleration operation is performed and the turning level falls within the predetermined value.

In FIG. 20, the first control is started when the condition that the deceleration operation is performed and the turning level is within the predetermined value is satisfied at a point Pcs1 (point B1) at which the line indicating the first target vehicle speed characteristic Vt1 intersects with the line indicating changes of the vehicle speed Vx, i.e., line Vxa. Even when the first control is not started because it is determined that the deceleration operation is not performed at the point Pcs1, if thereafter the condition that the deceleration operation is performed and the turning level falls within the predetermined value, the first control is started from the point where the condition is satisfied. However, in cases where the vehicle advances to the curve and the curvature radius is gradually smaller along the transition curve, which causes the turning state quantity of the vehicle to be greater than the predetermined value, the first control is not started even when the deceleration operation is performed. This is to avoid an occurrence of the operation change of the vehicle caused by the deceleration and to avoid the first control to start immediately before the first reference point Pcr1.

However, in a case where the road surface friction coefficient μ is equal to or smaller than a predetermined value (for example, 0.5 or less) because of compacted snow road, iced road, and the like, the first control is not performed. This is based on the following reasons. When the first and second appropriate vehicle speeds Vq1, Vq2, and the first and second decelerations Gx1 and Gx2 are specified to be smaller when the road surface friction coefficient μ is smaller as mentioned above, a difference between the first and second vehicle speed characteristics Vt1 and Vt2 is small. As a result, when the road surface friction coefficient μ is small, the second control execution condition may be satisfied immediately after the start and execution of the first control to thereby switch from the first control to the second control. In this case, the switching from the first control to the second control may give the driver the uncomfortable feeling.

Figure 23:
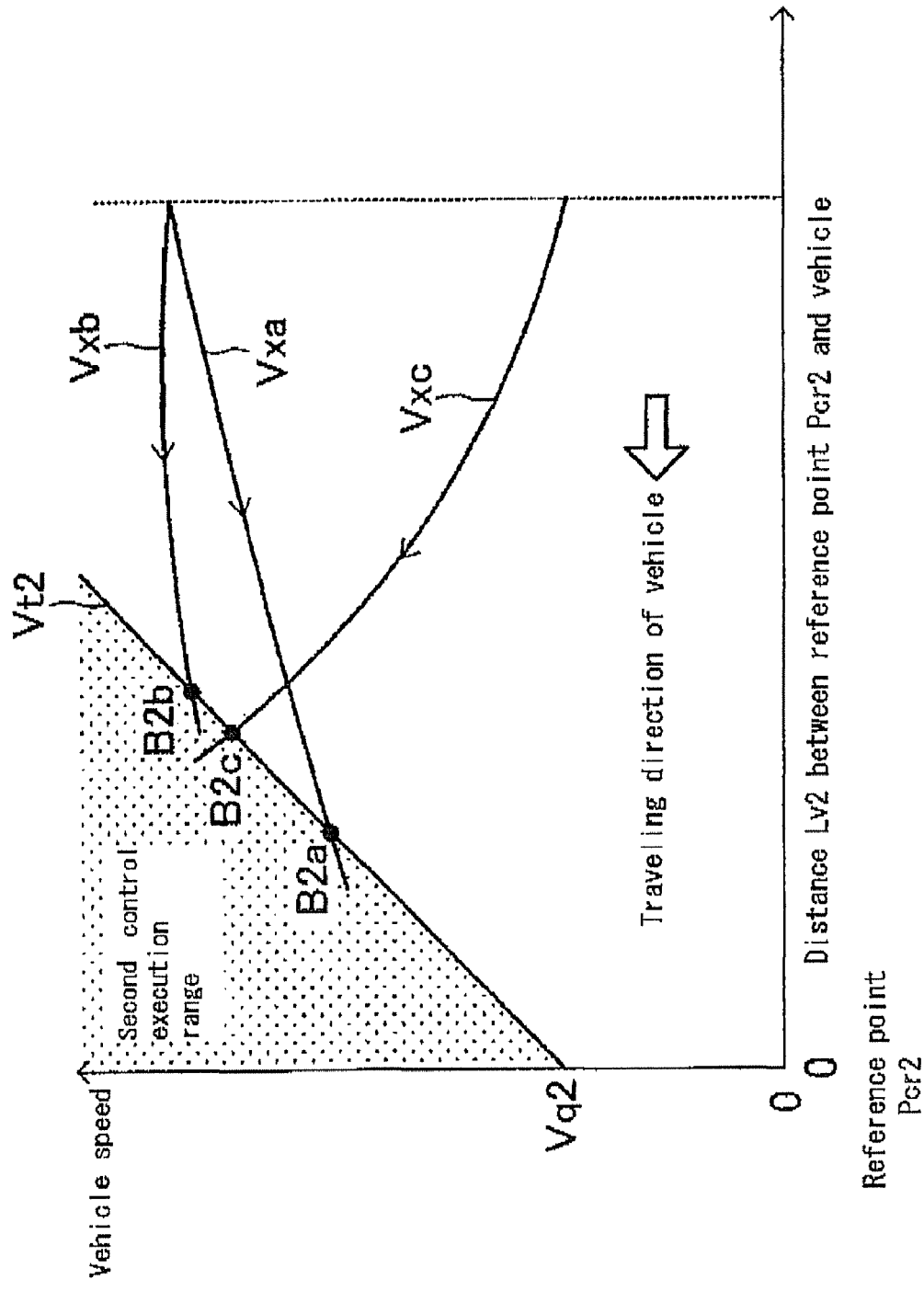
FIG. 23 is a diagram explaining a second control execution condition according to the second embodiment.

Next, the second control execution condition will be explained below. The second control execution condition is determined, in the same way as the first control permission control, on the basis of the relative distance between the curve and the vehicle, i.e., a distance Lv2 between the curve and the vehicle (which corresponds to the current vehicle position relative to the second reference point Pcr2), and the vehicle speed Vx. The distance Lv2 being zero (Lv2=0) indicates the second reference point Pcr2. In FIG. 23, the second control execution condition is satisfied in a range provided at an upper left side of the second target vehicle speed characteristic Vt2 shomn by fine dots (i.e., second control execution range).

That is, when a point (Lv2, Vx) passes over the second target vehicle speed characteristic Vt2 in the leftward direction in FIG. 23, the second control execution condition is satisfied, thereby starting and executing the second control. The second control has a property of the emergency braking. Thus, regardless of the road surface friction coefficient μ or the acceleration/deceleration operation by the driver before the control start, the second control is started and executed.

For example, the second control is started when the point (Lv2, Vx) passes over the second vehicle speed characteristic Vt2 in FIG. 23 in any cases where the vehicle is decelerated by the deceleration operation (vehicle speed Vxa), where the vehicle is driven at a substantially constant speed (vehicle speed Vxb), and where the vehicle is accelerated by the acceleration operation (vehicle speed Vxc) (see points B2a, B2b, and B2c). In FIG. 20, the second control is started at a point Pcs2 (point B2) at which the line indicating the second target vehicle speed characteristic Vt2 intersects with the line indicating changes of the vehicle speed Vx, i.e., line Vxc. In this case, when the deceleration of the vehicle obtained by the braking operation by the driver is greater than the deceleration Gx2, the braking operation by the driver is given priority and the second control is not executed.

The first control or the second control (i.e., curve travel control) is started and executed accordingly. FIG. 7 illustrates a functional block diagram relating to the curve travel control. As illustrated in FIG. 7, a target vehicle speed characteristic obtaining means B1 calculates a target vehicle speed Vt1 (Vt2) at the current vehicle position on the basis of the target vehicle speed characteristic Vt1 (Vt2). A vehicle speed obtaining means B2 obtains the current vehicle speed Vx.

A speed reduction control variable calculating means B3 determines a speed reduction control variable Gst on the basis of a deviation ΔVx1 (ΔVx2) between the vehicle speed Vx and the target vehicle speed Vt1 (Vt2) (ΔVx1 (ΔVx2)=Vx−Vt1 (=Vx−Vt2). The speed reduction control variable Gst is determined to be zero (0) in a case where the deviation ΔVx1 (ΔVx2) is negative. On the other hand, in a case where the deviation ΔVx1 (ΔVx2) is positive, the greater the deviation ΔVx1 (ΔVx2) is, the greater value the speed reduction control variable Gst is determined to be.

Then, on the basis of the speed reduction control variable Gst, one or more of the reduction of the engine output by an engine output reducing means B4 (at least one of a reduction of the throttle opening degree, a retardation of an ignition timing, and a reduction of a fuel injection amount), an increase of the 'reduction gear ratio' (downshift and the like) by a transmission controlling means B5, and an application of a brake torque (application of the brake pressure) executed by a wheel brake controlling means B6 by means of the wheel brake, is execute. As a result, the vehicle speed Vx is reduced down to the appropriate vehicle speed Vq1 (Vq2) by following the target vehicle speed characteristic Vt1 (Vt2).

When the vehicle speed Vx substantially reaches the first (second) appropriate vehicle speed Vq1 (Vq2) during the execution of the first (second) control, the first (second) control is finished. Specifically, when the decreasing vehicle speed Vx reaches a point present within a small range Hn1 (Hn2) in which the appropriate vehicle speed Vq1 (Vq2) is included, the first (second) control is finished.

After the first (second) control is finished, then the acceleration limit control is continuously started and executed. That is, while the wheel brake control is completely finished (the brake torque and the brake pressure are set to zero), a state of limited acceleration (limited throttle opening degree) and downshift of the transmission TM is continued for a predetermined distance (or time).

When the driver operates the acceleration pedal AP immediately after the curve travel control, the vehicle may be suddenly accelerated (i.e., excessive acceleration slip may occur on a driving wheel). In order to avoid such incident, the acceleration limit control is performed.

In the acceleration limit control, as illustrated in FIG. 20, firstly, the acceleration is completely limited (from a point A1 (A2) to a point C1 (C2), i.e., from the first (second) control ending point to a point Pca1 (Pca2)) for a predetermined period of time (i.e., vehicle speed maintaining period). Then, a degree of limitation on the acceleration is gradually relaxed for a predetermined period of time (i.e., acceleration limiting period) so that an allowable acceleration degree gradually increases (from the point C1 (C2) to a point D1 (D2), i.e., from the point Pca1 (Pca2) to a point Pco1 (Pco2)). Then, finally, the acceleration limit is cancelled (at the point D1 (D2), point Pco1 (Pco2)) when the acceleration limiting period is fulfilled.

After the end of the first control, for example, the point Pca1 may be provided at the front side (closer to the vehicle) in the vicinity of the constant curvature radius zone ending point Ce. In addition, the point Pco1 may be provided at the front side in the vicinity of the exit transition curve zone ending point Cd. That is, the vehicle is driven at a constant speed in the constant curvature radius zone. Then, the degree of limitation on the acceleration is gradually relaxed after the vehicle advances to the exit transition curve zone. The acceleration limit is cancelled at the curve ending point. Accordingly, the vehicle speed is changed in response to the shape of the curve without giving the uncomfortable feeling to the driver.

After the end of the second control, because the purpose of the second control (i.e., to maintain the driving stability within the turning limit) has been already accomplished, the vehicle speed maintaining period and the acceleration limiting period are both specified to be shorter than those for the first control. That is, the point Pca2 is provided at the front side of the point Pca1, and the point Pco2 is provided at the front side of the point Pco1.

The driver may prefer accelerating the vehicle towards the curve ending point. Hence, the device may be modified so that the downshift of the transmission TM is continued (i.e., constant reduction gear ratio is continued) for a predetermined period after the acceleration limit is cancelled.

Figure 24:
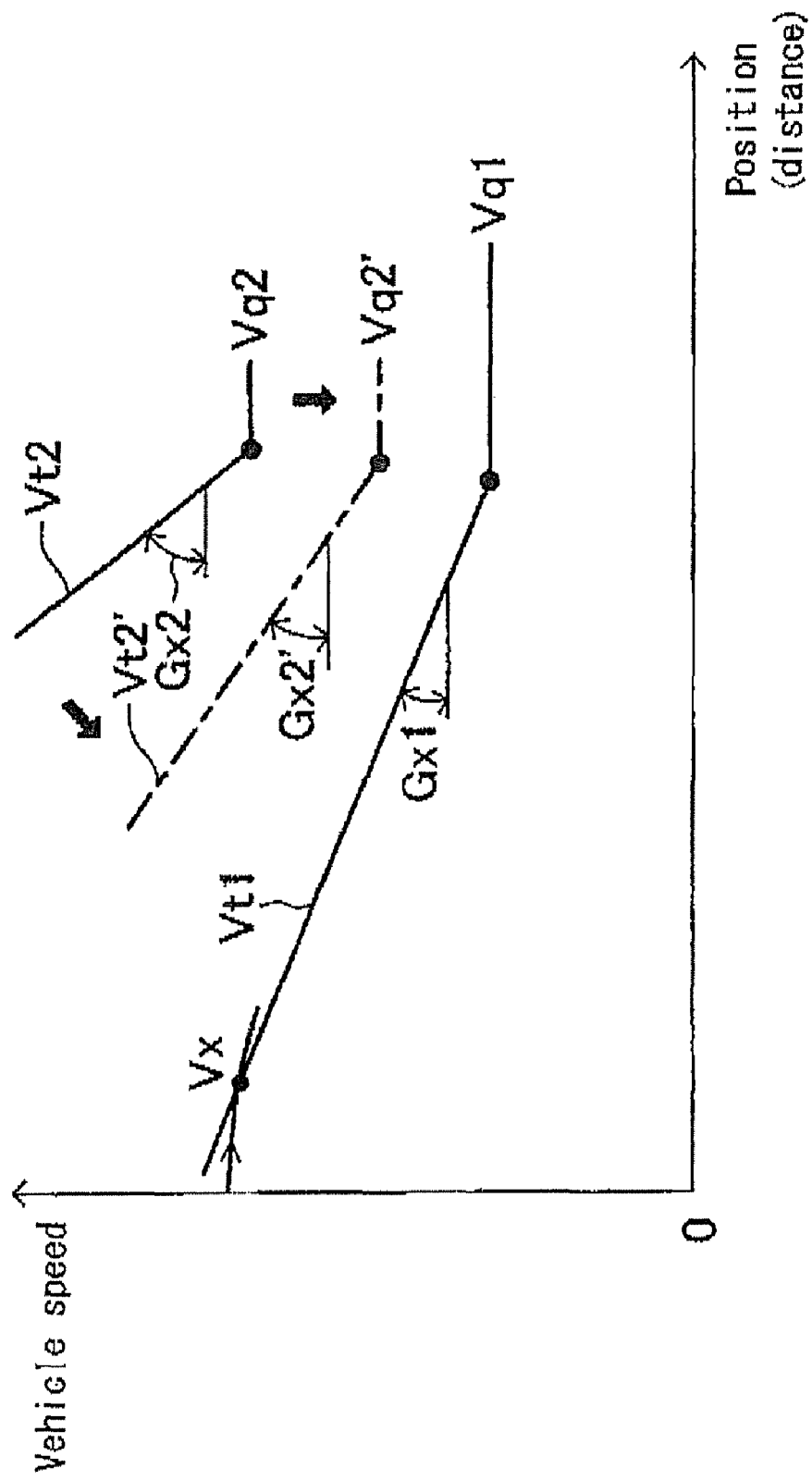
FIG. 24 is a graph illustrating changes of a second target vehicle speed characteristic in a state where the road surface friction coefficient varies during the execution of the first control according to the second embodiment.

The road surface friction coefficient μ may vary within the curve. As illustrated in FIG. 24, in a case where the variation (decrease in FIG. 24, for example) of the road surface friction coefficient μ is detected during the execution of the first control, the second target vehicle speed characteristic is immediately changed from Vt2 to Vt2'. Specifically, the second appropriate vehicle speed Vq2 is changed to Vq2' (<Vq2), and the deceleration is changed from Gx2 to Gx2'. Accordingly, the second control is started and executed in a state where the appropriate turning limit depending on the road surface friction coefficient is recognized.

Figure 25:
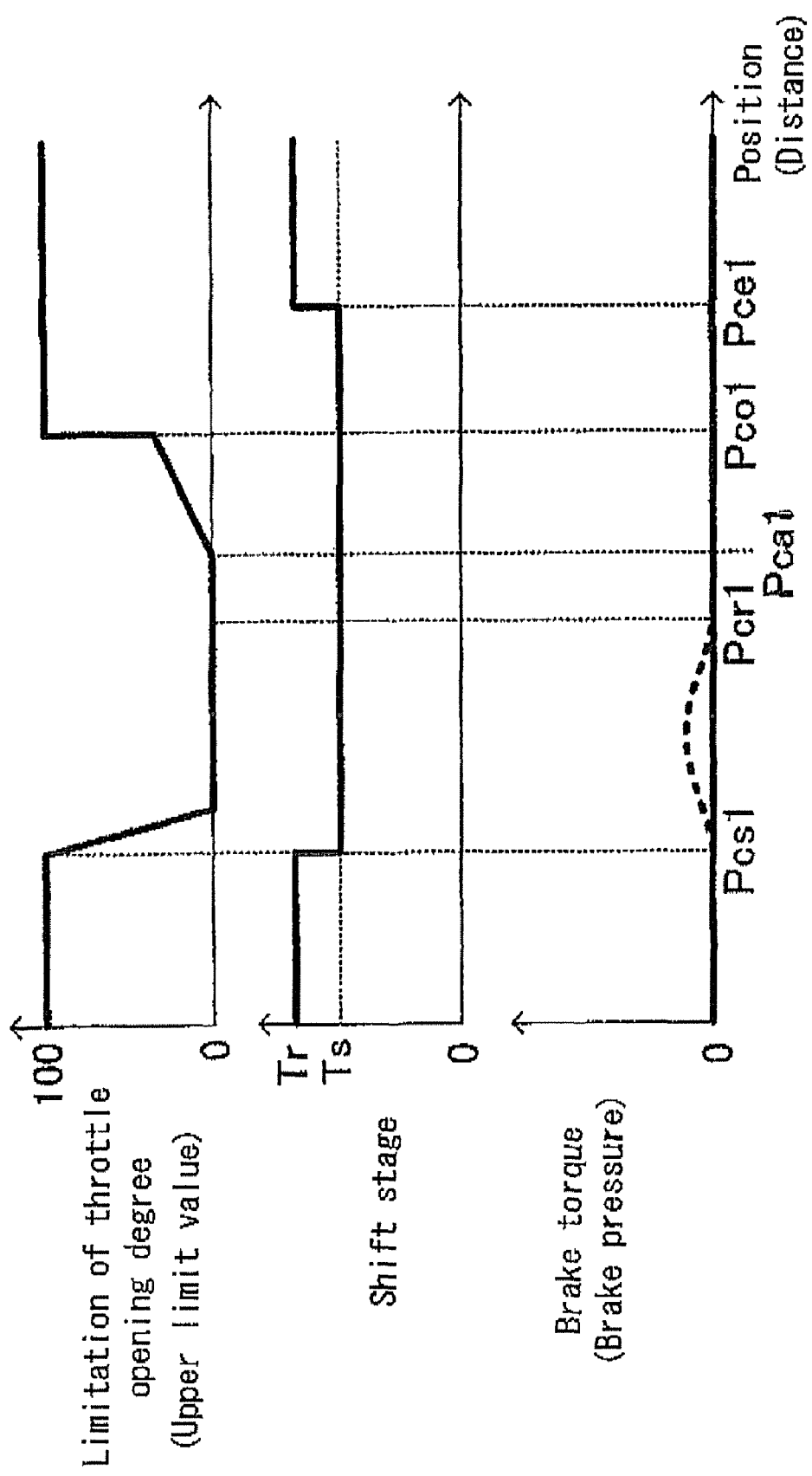
FIG. 25 is a diagram illustrating an example of a case where the first control is performed by the device shown in FIG. 1 according to the second embodiment.

FIG. 25 illustrates an example of a case where the first control (travel assistance control) is performed by the device according to the second embodiment. When the vehicle passes over the point Pcs1 at which the first control execution condition is satisfied, the first control is started. Accordingly, the limitation of the throttle opening degree (the throttle opening degree does not exceed an upper limit value although the throttle opening degree is allowed up to the upper limit value), the increase of the reduction gear ratio of the transmission TM (downshift from the shift stage Tr to the shift stage Ts), and the application of the brake torque (brake pressure) by the wheel brake are started.

In the example shown in FIG. 25, the brake torque (brake pressure) is not applied by the wheel brake. This is because of the following reasons. That is, the first deceleration Gx1 of the first control smaller than the second deceleration Gx2 of the second control is achievable only by the limitation of the throttle opening degree and the increase of the reduction gear ratio. In addition, the usage of the wheel brake leads to the decrease in the fuel efficiency. Thus, according to the example shown in FIG. 25, the wheel brake is not used for improvement of fuel efficiency. However, as illustrated by a dashed line in FIG. 25, the brake torque (brake pressure) may be applied by the wheel brake.

The vehicle is gradually decelerated by the first control. The first control is finished at a point where the vehicle speed Vx substantially matches the first appropriate vehicle speed Vq1 (in the vicinity of the first reference point Pcr1). Accordingly, while the brake torque of the wheel brake becomes zero (0) (in a case where the brake torque is applied as illustrated by the dashed line in FIG. 25), the above-described acceleration limit control is continuously started. Therefore, a limit is set for the throttle opening degree (the upper limit value is equal to zero) until the vehicle passes over the point Pca1. Then, the acceleration limit is gradually relaxed and is completely cancelled when the vehicle passes over the point Pco1. At this time, the downshifted state of the transmission TM (the shift stage=Ts) is maintained until the vehicle passes the point Pce1 in preparation for the acceleration operation by the driver. However, in a case where the driver does not conduct the acceleration operation, an upshift from the shift stage Ts to the shift stage Tr is executed.

Figure 26:
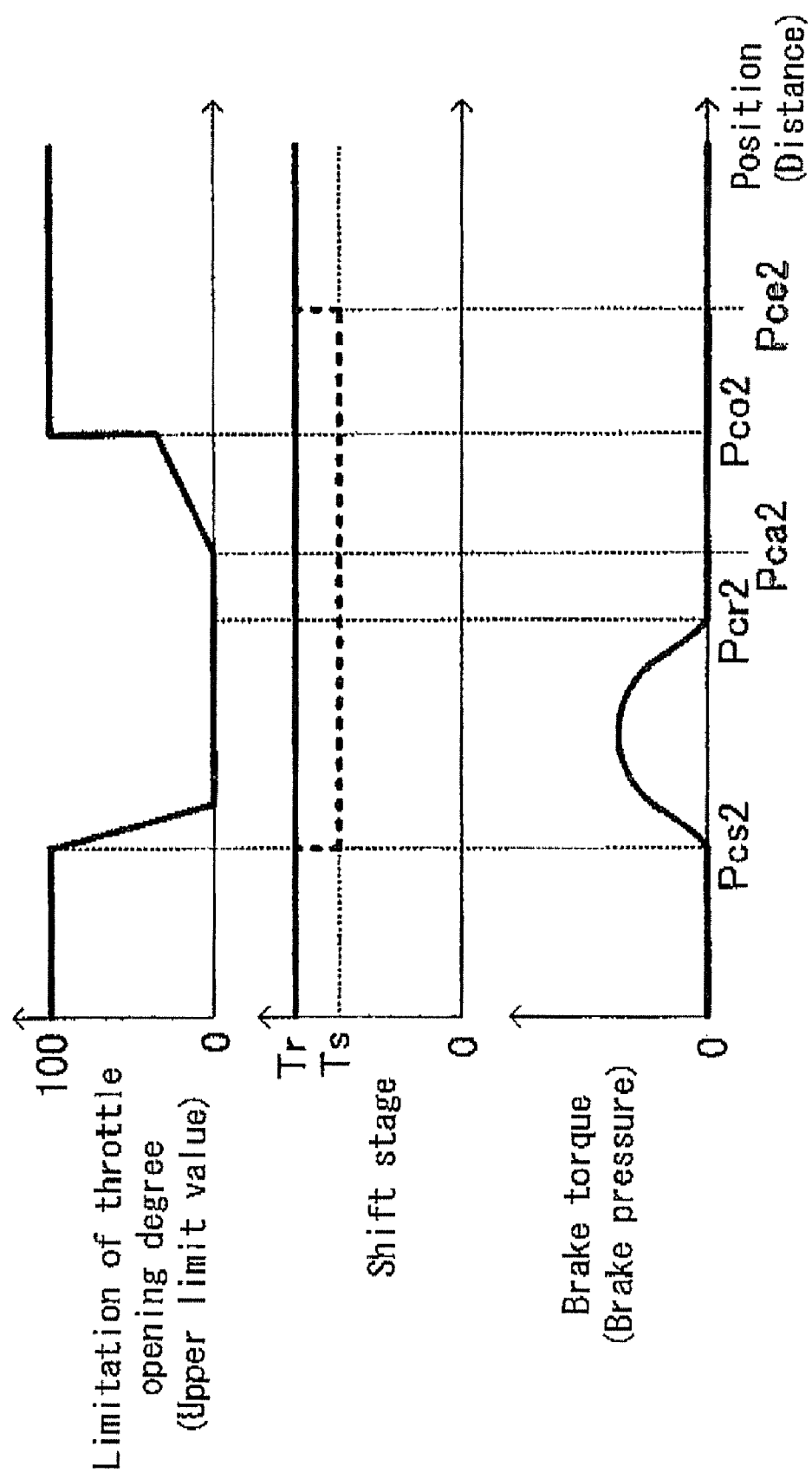
FIG. 26 is a diagram illustrating an example of a case where the second control is performed by the device shown in FIG. 1 according to the second embodiment.

FIG. 26 illustrates an example of a case where the second control (limit prevention control) is performed by the device according to the second embodiment. The second control is started when the vehicle passes over the point Pcs2 at which the second control execution condition is satisfied. Accordingly, the limitation of the throttle opening degree, and the application of the brake torque (brake pressure) by the wheel brake are started.

According to the example shown in FIG. 26, the increase of the reduction gear ratio of the transmission TM (i.e., downshift from the shift stage Tr to the shift stage Ts) is not conducted. This is because of the following reasons. That is, the brake load of the driving wheel increases because of the downshift of the transmission TM. Thus, a balance of the yaw moment of the vehicle is lost, thereby causing an unexpected yaw motion. In particular, a relatively large deceleration is given by the second control, which is likely to induce the unexpected yaw motion. Thus, according to the example shown in FIG. 26, in order to prevent such incident, the downshift of the transmission TM is not performed. However, as shown by a dashed line in FIG. 26, the downshift of the transmission TM may be conducted.

The vehicle is gradually decelerated by the second control. The second control is finished at a point where the vehicle speed Vx substantially matches the second appropriate vehicle speed Vq2 (in the vicinity of the second reference point Pcr2). Accordingly, while the brake torque of the wheel brake becomes zero (0), the above-described acceleration limit control is continuously started. Therefore, a limit is set for the throttle opening degree (the upper limit value is equal to zero) until the vehicle passes over the point Pca2. Then, the acceleration limit is gradually relaxed and is completely cancelled when the vehicle passes over the point Pco2. At this time, the downshifted state of the transmission TM (the shift stage=Ts) is maintained until the vehicle passes the point Pce2 in preparation for the acceleration operation by the driver. However, in a case where the driver does not conduct the acceleration operation, an upshift from the shift stage Ts to the shift stage Tr is executed.

According to the aforementioned motion control device for a vehicle of the second embodiment, two types of speed reduction control, i.e., the travel assistance control and the limit prevention control, are used in the curve travel control in response to the driving state of the vehicle. Thus, the curve travel control is effectively performed.

The motion control device for a vehicle is not limited to the aforementioned embodiment and may be modified as follows. For example, according to the second embodiment, the acceleration limit control is executed after the end of the first control. However, the acceleration limit control may be omitted. Further, even after the start of the first control, if the acceleration operation is performed by the driver, the first control may be cancelled at that time. This is because the first control is started and executed within a traveling range sufficiently smaller than that of the turning limit of the vehicle. Therefore, the acceleration operation by the driver can be given priority. Further, in order to directly reflect the acceleration intention of the driver, the acceleration limit control after the end of the second control may be omitted.

According to the aforementioned second embodiment, the first control execution condition is satisfied when the deceleration operation is performed by the driver and the turning level is within the predetermined value in addition to the satisfaction of the first control permission condition (see FIG. 22). In this case, the condition of the turning level within the predetermined value may be omitted from the first control execution condition.

Further, in a case where the driver operates the brake pedal BP during the first (second) control, the first (second) control may be finished when the deceleration required by the driver (request deceleration Gdr) is greater than the deceleration Gx1 (Gx2). When the request deceleration Gdr is equal to or smaller than the deceleration Gx1 (Gx2), the first (second) control is continued. This is to maintain the vehicle deceleration necessary for driving through the curve at the appropriate vehicle speed Vq1 (Vq2).

Furthermore, in a state where the driver operates the brake pedal BP, the acceleration limit control may not be performed after the end of the first (second) control. Because the driver does not operate the acceleration pedal AP, the limit on the acceleration is not required.

The motion control device according to the present embodiment includes the vehicle speed obtaining means (B215), the curve shape obtaining means (B220), the position obtaining means (B225), the first determining means (B305, B310), the first calculating means (B315), the second determining means (B305, B310), the second calculating means (B315), and the speed reduction operation obtaining means (B230). The first control corresponds to a travel assistance control and the second control corresponds to a limit protection control.

The aforementioned means are explained below. In the following, a point closer to the vehicle relative to a predetermined point may be referred to as 'a front side'. A point farther from the vehicle relative to the predetermined point may be referred to as 'a back side'. Further, a term 'passing the curve starting point' may be expressed as 'advancing to the curve'. A term 'passing the curve ending point' may be expressed as 'exiting from the curve'. Furthermore, terms following "the first" are related to the travel assistance control and terms following "the second" are related to the limit protection control.

The vehicle speed obtaining means (B215) obtains the speed (Vx) of the vehicle by means of one of known methods, such as a usage of an output of a wheel speed sensor (WS**).

The curve shape obtaining means (B220) obtains the shape (Rc, Rm) of the curve existing ahead of the vehicle on a road on which the vehicle is traveling. The shape (Rc, Rm) of the curve is obtained, for example, from road information stored in a navigation device mounted onto the vehicle.

The position obtaining means (B225) obtains the relative position of the vehicle to the curve. The relative position (Lv1, Lv2) is obtained, for example, from road information stored in the navigation device mounted onto the vehicle and a vehicle position acquired from a global positioning system mounted onto the navigation device.

The first determining means (B305, B310) determines the first appropriate vehicle speed (Vq1) that is an appropriate vehicle speed for the vehicle passing through the curve. Specifically, the first reference point (Pcr1) on the road is determined on the basis of the shape (Rc, Rm) of the curve, and the first appropriate vehicle speed (Vq1) for the vehicle passing over the first reference point (Pcr1) is determined. The first appropriate vehicle speed (Vq1) is specified to be sufficiently smaller than the vehicle speed for the turning limit of the vehicle. The first reference point (Pcr1) is desirably provided in the middle of the curve (i.e., between the curve starting point (Ci) and the curve ending point (Cd)).

The first calculating means (B315) calculates, on the basis of the first appropriate vehicle speed (Vq1) (and the first reference point (Pcr1)), the first target vehicle speed characteristic (Vt1) that is a target of the reduction characteristic of the vehicle speed relative to the position on the road closer to the vehicle relative to the first reference point (Pcr1) in a case where the vehicle is decelerated when advancing to the curve (on the road closer to the vehicle relative to the first reference point (Pcr1)). The first target vehicle speed characteristic (Vt1) has, for example, a property in which the vehicle speed becomes the first appropriate vehicle speed (Vq1) at the first reference point (Pcr1) and in which the first target vehicle speed characteristic (Vt1) is increased as being away from the first reference point (Pcr1) towards the vehicle. The first target vehicle speed characteristic (Vt1) may be specified so that the deceleration of the vehicle is constant.

The second determining means (B305, B310) determines the second appropriate vehicle speed (Vq2) that is larger than the first appropriate vehicle speed (Vq1) and that is an appropriate vehicle speed for the vehicle passing through the curve. Specifically, the second reference point (Pcr2) on the road is determined on the basis of the shape (Rc, Rm) of the curve. The appropriate vehicle speed for the vehicle passing over the second reference point (Pcr2) is determined as the second appropriate vehicle speed (Vq2). The second appropriate vehicle speed (Vq2) is specified adjacent to the vehicle speed for the turning limit of the vehicle. The second reference point (Pcr2) is desirably provided in the middle of the curve (i.e., between the curve starting point (Ci) and the curve ending point (Cd)).

The second calculating means (B315) calculates, on the basis of the second appropriate vehicle speed (Vq2) (and the second reference point (Pcr2)), the second target vehicle speed characteristic (Vt2) that is a target of the reduction characteristic of the vehicle speed relative to the position on the road closer to the vehicle relative to the second reference point (Pcr2) in a case where the vehicle is decelerated when advancing to the curve (on the road closer to the vehicle relative to the second reference point (Pcr2)). The second target vehicle speed characteristic (Vt2) has, for example, a property in which the vehicle speed becomes the second appropriate vehicle speed (Vq2) at the second reference point (Pcr2) and in which the second target vehicle speed characteristic (Vt2) is increased as being away from the second reference point (Pcr2) towards the vehicle. The second target vehicle speed characteristic (Vt2) may be specified so that the deceleration of the vehicle is constant.

The deceleration operation obtaining means (B230) obtains the deceleration operation by the driver. The deceleration operation is obtained, for example, when the operation variable (Ap) of the acceleration operation member (acceleration pedal (AP)) is equal to or smaller than a predetermined value (Ap2, zero is included), and/or the operation variable (Bp) of the brake operation member (brake pedal (BP)) is greater than a predetermined value (Bp1, which may be zero).

The first controlling means (B265) starts and executes the first control for decelerating the vehicle to the first appropriate vehicle speed (Vq1) in a state where the first control execution condition in which the relationship between the vehicle speed (Vx) and the relative position (Lv1) (i.e., the position of the vehicle relative to the first reference point (Pcr1), the distance between the vehicle and the first reference point (Pcr1)) is determined on the basis of the first target vehicle speed characteristic (Vt1) is satisfied.

The second controlling means (B260) starts and executes the second control for decelerating the vehicle to the second appropriate vehicle speed (Vq2) regardless of whether or not the deceleration operation is performed in a state where the second control execution condition in which the relationship between the vehicle speed (Vx) and the relative position (Lv2) (i.e., the position of the vehicle relative to the second reference point (Pcr2), the distance between the vehicle and the second reference point (Pcr2)) is determined on the basis of the second target vehicle speed characteristic (Vt2) is satisfied.

The first control permission condition (B255) (second control execution condition (B250)) is satisfied, for example, when the current vehicle speed (Vx) exceeds the first (second) target vehicle speed specified for the current vehicle position relative to the first (second) reference point (Pcr1, Pcr2) obtained from the first (second) target vehicle speed characteristic (Vt1, Vt2). The first (second) control is desirably performed so that the vehicle speed (Vx) decreases along the first (second) target vehicle speed characteristic (Vt1, Vt2). For example, the vehicle speed (Vx) is feedback-controlled so that a difference (ΔVx) between the vehicle speed (Vx) and the first (second) target vehicle speed specified for the current vehicle position relative to the first (second) reference point (Pcr1, Pcr2) obtained from the first (second) target vehicle speed characteristic (Vt1, Vt2). Alternatively, using the first (second) target deceleration (Gx1, Gx2) (for the position on the road), the deceleration is feedback-controlled so that the current deceleration (Gx) matches the first (second) target deceleration (Gx1, Gx2) (which is constant, for example). The vehicle deceleration is achievable by, for example, the wheel brake, the output reduction of the driving source, the downshift of the transmission (from the upper shift stage to the lower shift state, increase of the reduction gear ratio), and the like. Further, the first (second) control is desirably finished when the vehicle speed falls within or reaches the first (second) predetermined range (Hn1, Hn2) in which the first (second) appropriate vehicle speed (Vq1, Vq2) is included. The width of the first (second) predetermined range (Hn1, Hn2) may be zero.

The second controlling means (B260) starts and executes the second control regardless of whether or not the first control is performed. In addition, the first controlling means (B265) does not perform the first control while the second control is being performed.

According to the motion control device for a vehicle of the aforementioned embodiment, the first control (travel assistance control) is started and executed when the first control permission condition (B255) is satisfied and the deceleration operation is performed by the driver (i.e., the first control execution condition (B255) is satisfied). In addition, in a case where the second control execution condition (B250) is satisfied, the second control (i.e., limit protection control) is started and executed. Further, in a case where the second control execution condition (B250) is satisfied while the first control is being performed, the switching from the first control to the second control is conducted. When the second control is started and executed, the first control is not performed. That is, when the execution conditions for the first and second controls are both satisfied, the second control is given priority.

As a result, two types of the speed reduction control, i.e., the travel assistance control and the limit protection control are used and selectable depending on the traveling state of the vehicle. The speed reduction control is efficiently performed accordingly.

According to the motion control device of the present embodiment, the second reference point (Pcr2) is specified on the road farther away from the vehicle relative to the first reference point (Pcr1). In addition, the deceleration (Gx2) of the vehicle speed (a reduction gradient relative to the position on the road) in the second target vehicle speed characteristic (Vt2) is specified to be larger than that (Gx1) in the first target vehicle speed characteristic (Vt1).

The limit protection control serves as an emergency braking to prevent the turning level of the vehicle from exceeding the turning limit thereof. Thus, according to the limit protection control, the speed reduction control is desirably started at a relatively later timing, and the deceleration under control is specified as large as possible within a range not to exceed the slip limit. On the other hand, the travel assistance control is provided for simulating a predictive driving by the driver accompanied by the deceleration operation. Thus, according to the travel assistance control, the speed reduction control is started earlier than the limit protection control. The deceleration under control is desirably specified to be smaller than that according to the limit protection control.

Consequently, the limit protection control is prevented from unnecessarily frequently starting. In addition, in the travel assistance control, the vehicle is decelerated along the deceleration characteristic based on the predictive driving by the driver without giving the uncomfortable feeling to the driver.

According to the motion control device for a vehicle of the aforementioned embodiment, in a case where the friction coefficient obtaining means (B235) is provided for obtaining the friction coefficient ($\mu$) between the surface of the road and the tire of the wheel, the first and second determining means (B305, B310) are configured to specify the first and second appropriate vehicle speeds (Vq1, Vq2) to be smaller when the friction coefficient ($\mu$) is smaller. The first and second calculating means (B315) are configured to specify the deceleration (Gx1, Gx2) of the vehicle speed in the first and second target vehicle speed characteristics (Vt1, Vt2) to be smaller when the friction coefficient ($\mu$) is smaller.

In this case, the first controlling means (B265) is desirably configured so as not to perform the first control when the friction coefficient ($\mu$) is equal to or smaller than the predetermined value. In a case where the first and second appropriate vehicle speeds (Vq1, Vq2) and the deceleration (Gx1, (Gx2) of the vehicle speed in the first and second target vehicle speed characteristics (Vt1, Vt2) are determined on the basis of the friction coefficient ($\mu$), the difference between the first and second target vehicle speed characteristics (Vt1, Vt2) (relative to the position on the road) is smaller when the friction coefficient ($\mu$) is smaller.

That is, when the friction coefficient ($\mu$) is small, the start of the second control is immediately determined after the first control is started and executed, and thereafter the control is switched from the first control to the second control. In this case, such switching of the control may give the uncomfortable feeling to the driver. Thus, the second control having the higher requirement is desirably given priority so that only the second control is performed. Accordingly, the driver is prevented from receiving the uncomfortable feeling caused by the switching of the control.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A motion control device for a vehicle, comprising:
 a vehicle speed obtaining means for obtaining a speed of the vehicle;
 a curve shape obtaining means for obtaining a shape of a curve existing ahead of the vehicle on a road on which the vehicle is traveling;
 a position obtaining means for obtaining a relative position of the vehicle to the curve;
 a determining means for determining an appropriate vehicle speed for the vehicle to travel through the curve based on the shape of the curve obtained by the curve shape obtaining means;
 a speed reduction controlling means for performing a speed reduction control on the vehicle based on the appropriate vehicle speed determined by the determining means;
 wherein the determining means determines, on the basis of the shape of the curve, a reference point in the middle of the curve and the appropriate vehicle speed for the vehicle to pass over the reference point, and the device further comprising:
 a calculating means for calculating, on the basis of the reference point and the appropriate vehicle speed, a target vehicle speed characteristic which is a target of a reduction characteristic of the vehicle speed relative to a position on the road in a case where the vehicle is decelerated on the road between the reference point and a point closer to the vehicle relative to the reference point, wherein the speed reduction controlling means starts the speed reduction control for decelerating the vehicle in a case where a relationship between the vehicle speed and a position of the vehicle relative to the reference point obtained from the relative position meets a control start condition determined on the basis of the target vehicle speed characteristic and finishes the speed reduction control in a case where the vehicle speed falls within a predetermined range in which the appropriate vehicle speed is included.

2. The motion control device according to claim 1, wherein the determining means determines the reference point at an ending point of an advance transition curve zone of the curve or at a point closer to the vehicle relative to the ending point.

3. The motion control device according to claim 1, further comprising:
 an acceleration limit controlling means for limiting a degree of an acceleration of the vehicle for a predetermined time from an end point of the speed reduction control.

4. The motion control device according to claim 1, further comprising:
 an acceleration limit controlling means for limiting a degree of an acceleration of the vehicle while the vehicle is traveling for a predetermined distance from an end point of the speed reduction control.

5. The motion control device according to claim 3, wherein the acceleration limit controlling means determines the predetermined time based on a distance of a constant curvature radius zone of the curve.

6. The motion control device according to claim 1, further comprising a limit vehicle speed calculating means for calculating a limit vehicle speed characteristic based on the shape of the curve obtained by the curve shape obtaining means, wherein the target vehicle speed characteristic calculated by the calculating means is equal to or smaller than the limit vehicle speed characteristic.

7. The motion control device according to claim 4, wherein the acceleration limit controlling means determines the predetermined distance based on a distance of a constant curvature radius zone of the curve.

8. The motion control device according to claim 1, wherein when the curve shape obtaining means obtains the shape of two or more of the curves existing ahead of the vehicle, the determining means is configured to determine the reference point and the appropriate vehicle speed for each of the curves, and the calculating means calculates, on the basis of the reference point and the appropriate vehicle speed determined for each of the curves, a characteristic which corresponds to the target vehicle speed characteristic and based on which the control start condition is satisfied for each of the curves, the characteristic for the control start condition that is satisfied at the earliest timing being used as the target vehicle speed characteristic used by the speed reduction controlling means.

9. The motion control device according to claim 1, wherein the target vehicle speed characteristic calculated by the calculating means includes at least one of properties in which a deceleration of the vehicle increases at a first-half of the speed reduction control and the deceleration decreases at a second-half of the speed reduction control.

10. A motion control device for a vehicle, comprising:
a vehicle speed obtaining means for obtaining a speed of the vehicle;
a curve shape obtaining means for obtaining a shape of a curve existing ahead of the vehicle on a road on which the vehicle is traveling;
a position obtaining means for obtaining a relative position of the vehicle to the curve;
a determining means for determining an appropriate vehicle speed for the vehicle to travel through the curve based on the shape of the curve obtained by the curve shape obtaining means;
a speed reduction controlling means for performing a speed reduction control on the vehicle based on the appropriate vehicle speed determined by the determining means;
wherein the determining means includes a first determining means determining the appropriate vehicle speed as a first appropriate vehicle speed and a second determining means determining a second appropriate vehicle speed which is greater than the first appropriate vehicle speed and is an appropriate vehicle speed for the vehicle passing through the curve based on the shape of the curve, the device further comprising:
a first calculating means for calculating, on the basis of the first appropriate vehicle speed, a first target vehicle speed characteristic which is a target of a reduction characteristic of the vehicle speed relative to a position on the road in a case where the vehicle is decelerated when advancing to the curve;
a second calculating means for calculating, on the basis of the second appropriate vehicle speed, a second target vehicle speed characteristic which is a target of the reduction characteristic of the vehicle speed relative to a position on the road in a case where the vehicle is decelerated when advancing to the curve; and
a deceleration operation obtaining means for obtaining a deceleration operation by a driver, wherein the speed reduction controlling means includes a first controlling means for starting and executing a first control for decelerating the vehicle to the first appropriate vehicle speed in a state where a first control permission condition is satisfied and the deceleration operation is performed, the first control permission condition in which a relationship between the vehicle speed and the relative position is determined on the basis of the first target vehicle speed characteristic, and a second controlling means for starting and executing a second control for decelerating the vehicle to the second appropriate vehicle speed regardless of whether or not the deceleration operation is performed in a state where a second control execution condition is satisfied, the second control execution condition in which a relationship between the vehicle speed and the relative position is determined on the basis of the second target vehicle speed characteristic, the second controlling means starting and executing the second control regardless of whether or not the first control is being executed, the first controlling means being prevented from starting the first control during the execution of the second control.

11. The motion control device according to claim 10, wherein
the first determining means is configured to determine a first reference point on the road based on the shape of the curve and to determine a vehicle speed appropriate for the vehicle to pass over the first reference point as the first appropriate vehicle speed,
the first calculating means calculates, on the basis of the first reference point and the first appropriate vehicle speed, the first target vehicle speed characteristic which is the target of the reduction characteristic of the vehicle speed relative to the position on the road closer to the vehicle relative to the first reference point in a case where the vehicle is decelerated when advancing to the curve,
the second determining means is configured to determine, on the basis of the shape of the curve, a second reference point on the road farther from the vehicle relative to the first reference point and to determine a vehicle speed appropriate for the vehicle to pass over the second reference point as the second appropriate vehicle speed, and
the second calculating means calculates, on the basis of the second reference point and the second appropriate vehicle speed, the second target vehicle speed characteristic which is the target of the reduction characteristic of the vehicle speed relative to the position on the road closer to the vehicle relative to the second reference point in a case where the vehicle is decelerated when advancing to the curve.

12. The motion control device according to claim 10, wherein a reduction degree of the vehicle speed in the second target vehicle speed characteristic is specified to be larger than a reduction degree of the vehicle speed in the first target vehicle speed characteristic, the first controlling means being configured to perform the first control to decrease the vehicle speed along the first target vehicle speed characteristic, the second controlling means being configured to perform the second control to decrease the vehicle speed along the second target vehicle speed characteristic.

13. The motion control device according to claim 10, further comprising:
a friction coefficient obtaining means for obtaining a friction coefficient between a surface of the road and a tire; wherein
the first and second determining means are configured to determine the first and second appropriate vehicle speeds to be smaller when the friction coefficient is smaller,
the first and second calculating means are configured to specify the reduction degree of the vehicle speed in the first and second target vehicle speed characteristics to be smaller when the friction coefficient is smaller, and
the first controlling means is configured not to perform the first control in a case where the friction coefficient is equal to or smaller than a predetermined value.

* * * * *